(12) United States Patent
Touboul

(10) Patent No.: US 10,313,368 B2
(45) Date of Patent: Jun. 4, 2019

(54) SYSTEM AND METHOD FOR PROVIDING DATA AND DEVICE SECURITY BETWEEN EXTERNAL AND HOST DEVICES

(71) Applicant: CUPP Computing AS, Oslo (NO)

(72) Inventor: Shlomo Touboul, Kefar Haim (IL)

(73) Assignee: CUPP Computing AS, Oslo (NO)

( * ) Notice: Subject to any disclaimer, the term of this patent is extended or adjusted under 35 U.S.C. 154(b) by 0 days.

(21) Appl. No.: 15/636,578

(22) Filed: Jun. 28, 2017

(65) Prior Publication Data

US 2018/0145994 A1    May 24, 2018

Related U.S. Application Data

(63) Continuation of application No. 12/042,938, filed on Mar. 5, 2008, now abandoned, which is a
(Continued)

(51) Int. Cl.
*H04L 29/06* (2006.01)
*G06F 21/56* (2013.01)
(Continued)

(52) U.S. Cl.
CPC ........ *H04L 63/1416* (2013.01); *G06F 13/385* (2013.01); *G06F 13/4282* (2013.01);
(Continued)

(58) Field of Classification Search
CPC ............................ H04L 63/1416; G06F 21/562
See application file for complete search history.

(56) References Cited

U.S. PATENT DOCUMENTS

H0001944 H    2/2001   Cheswick
6,286,087 B1  9/2001   Ito
(Continued)

FOREIGN PATENT DOCUMENTS

WO    2000078008    12/2000
WO    2004030308    4/2004
(Continued)

OTHER PUBLICATIONS

Breeden II, John et al., "A Hardware Firewall You Take With You," Government Computer News, located at http:/gcn.com/Articles/2005/06/01/A-hardware-firewall-you-take-with-you.aspx?p=1, Jun. 1, 2005.
(Continued)

*Primary Examiner* — John B King
(74) *Attorney, Agent, or Firm* — Sheppard, Mullin, Richter & Hampton LLP

(57) ABSTRACT

A secure data exchange system comprising a security device including a first external device plug, and a security engine operative to enforce a security policy on data transfer requests received from the host; an external device including a second external device plug; and a host including a first external device port operative to communicatively couple with the first external device plug, a second external device port operative to communicatively couple with the second external device plug, and a driver, e.g., a redirect driver, operative to transfer a data transfer request to the security device before executing the data transfer request.

20 Claims, 15 Drawing Sheets

Related U.S. Application Data continuation-in-part of application No. 11/376,919, filed on Mar. 15, 2006, now Pat. No. 8,381,297.

(60) Provisional application No. 60/893,109, filed on Mar. 5, 2007, provisional application No. 60/750,326, filed on Dec. 13, 2005.

(51) Int. Cl.
   *G06F 21/71* (2013.01)
   *G06F 13/38* (2006.01)
   *G06F 13/42* (2006.01)
   *G06F 21/85* (2013.01)

(52) U.S. Cl.
   CPC ............ *G06F 21/562* (2013.01); *G06F 21/71* (2013.01); *G06F 21/85* (2013.01)

(56) References Cited

U.S. PATENT DOCUMENTS

| | | |
|---|---|---|
| 6,466,779 B1 | 10/2002 | Moles |
| 6,772,345 B1 | 8/2004 | Shetty |
| 6,813,682 B2 | 11/2004 | Bress |
| 7,036,143 B1 | 4/2006 | Leung |
| 7,065,644 B2 | 6/2006 | Daniell |
| 7,069,330 B1 | 6/2006 | McArdle |
| 7,076,690 B1 | 7/2006 | Todd |
| 7,086,089 B2 | 8/2006 | Hrastar |
| 7,131,141 B1 | 10/2006 | Blewett |
| 7,168,089 B2 | 1/2007 | Nguyen |
| 7,184,554 B2 | 2/2007 | Freese |
| 7,197,638 B1 | 3/2007 | Grawrock |
| 7,283,542 B2 | 10/2007 | Mitchell |
| 7,353,533 B2 | 4/2008 | Wright |
| 7,359,983 B1 | 4/2008 | Maufer |
| 7,360,242 B2 | 4/2008 | Syvanne |
| 7,418,253 B2 | 8/2008 | Kavanagh |
| 7,529,932 B1 | 5/2009 | Haustein |
| 7,539,828 B2 | 5/2009 | Lomnes |
| 7,665,137 B1 | 2/2010 | Barton |
| 7,818,803 B2 | 10/2010 | Gordon |
| 7,908,476 B2 | 3/2011 | Kandasamy |
| 7,984,479 B2 | 7/2011 | Brabson |
| 7,992,199 B1 | 8/2011 | Winick |
| 8,180,654 B2 | 5/2012 | Berkman |
| 8,218,449 B2 | 7/2012 | Taylor |
| 8,218,558 B2 | 7/2012 | Tan |
| 8,234,261 B2 | 7/2012 | Monahan |
| 8,239,531 B1 | 8/2012 | Bellovin |
| 8,266,670 B1 * | 9/2012 | Merkow ............ H04L 67/1002 709/201 |
| 8,321,934 B1 | 11/2012 | Cooley |
| 8,402,528 B1 | 3/2013 | McCorkendale |
| 8,631,488 B2 | 1/2014 | Oz |
| 9,202,070 B2 | 12/2015 | Rajakarunanayake |
| 2001/0014102 A1 | 8/2001 | Mattingly |
| 2002/0111824 A1 * | 8/2002 | Grainger ............... G06Q 10/10 705/301 |
| 2003/0046397 A1 | 3/2003 | Trace |
| 2003/0055994 A1 | 3/2003 | Herrmann |
| 2003/0070084 A1 | 4/2003 | Satomaa |
| 2003/0097431 A1 | 5/2003 | Dill |
| 2003/0110391 A1 | 6/2003 | Wolff |
| 2003/0126468 A1 | 7/2003 | Markham |
| 2003/0131245 A1 | 7/2003 | Linderman |
| 2003/0142683 A1 | 7/2003 | Lam |
| 2003/0224758 A1 | 12/2003 | O'Neill |
| 2004/0003262 A1 | 1/2004 | England |
| 2004/0019656 A1 | 1/2004 | Smith |
| 2004/0064575 A1 | 4/2004 | Rasheed |
| 2004/0085944 A1 | 5/2004 | Boehm |
| 2004/0093520 A1 | 5/2004 | Lee |
| 2004/0123153 A1 | 6/2004 | Wright |
| 2004/0177274 A1 | 9/2004 | Aroya |
| 2004/0199763 A1 | 10/2004 | Freund |
| 2004/0203296 A1 | 10/2004 | Moreton |
| 2004/0210775 A1 | 10/2004 | Gbadegesin |
| 2004/0237079 A1 | 11/2004 | Cox |
| 2005/0055578 A1 | 3/2005 | Wright |
| 2005/0091522 A1 | 4/2005 | Hearn |
| 2005/0109841 A1 | 5/2005 | Ryan |
| 2005/0114711 A1 | 5/2005 | Hesselink |
| 2005/0149757 A1 | 7/2005 | Corbett |
| 2005/0208967 A1 | 9/2005 | Buniatyan |
| 2005/0254455 A1 | 11/2005 | Plehn |
| 2005/0260996 A1 | 11/2005 | Groenendaal |
| 2005/0265385 A1 | 12/2005 | Cromer |
| 2005/0278544 A1 | 12/2005 | Baxter |
| 2006/0022802 A1 | 2/2006 | Bridgelall |
| 2006/0031940 A1 | 2/2006 | Rozman |
| 2006/0037071 A1 | 2/2006 | Rao |
| 2006/0056317 A1 | 3/2006 | Manning |
| 2006/0059092 A1 | 3/2006 | Burshan |
| 2006/0064391 A1 | 3/2006 | Petrov |
| 2006/0074896 A1 | 4/2006 | Thomas |
| 2006/0075494 A1 | 4/2006 | Bertman |
| 2006/0075501 A1 | 4/2006 | Thomas |
| 2006/0085528 A1 | 4/2006 | Thomas |
| 2006/0161985 A1 | 7/2006 | Zhao |
| 2006/0174342 A1 * | 8/2006 | Zaheer ............... G06F 21/56 726/23 |
| 2006/0224794 A1 | 10/2006 | Stevens |
| 2006/0229741 A1 | 10/2006 | Achanta |
| 2006/0242686 A1 | 10/2006 | Toda |
| 2006/0277405 A1 | 12/2006 | Bowler |
| 2007/0005987 A1 | 1/2007 | Durham |
| 2007/0022474 A1 | 1/2007 | Rowett |
| 2007/0058642 A1 | 3/2007 | Eisink |
| 2007/0061887 A1 | 3/2007 | Hoover |
| 2007/0083939 A1 | 4/2007 | Fruhauf |
| 2007/0097976 A1 | 5/2007 | Wood |
| 2007/0104197 A1 | 5/2007 | King |
| 2007/0118874 A1 | 5/2007 | Adams |
| 2007/0118893 A1 | 5/2007 | Crawford |
| 2007/0123214 A1 * | 5/2007 | Mock ............... H04L 63/1416 455/410 |
| 2007/0130433 A1 | 6/2007 | Safa |
| 2007/0130457 A1 | 6/2007 | Kamat |
| 2007/0143827 A1 | 6/2007 | Nicodemus |
| 2007/0143851 A1 | 6/2007 | Nicodemus |
| 2007/0192500 A1 | 8/2007 | Lum |
| 2007/0192854 A1 | 8/2007 | Kelley |
| 2007/0199061 A1 | 8/2007 | Byres |
| 2007/0214369 A1 | 9/2007 | Roberts |
| 2007/0233842 A1 | 10/2007 | Roberts |
| 2007/0240217 A1 | 10/2007 | Tuvell |
| 2007/0261112 A1 | 11/2007 | Todd |
| 2007/0266265 A1 | 11/2007 | Zmudzinski |
| 2007/0281664 A1 | 12/2007 | Kaneko |
| 2007/0294744 A1 | 12/2007 | Alessio |
| 2008/0034419 A1 | 2/2008 | Mullick |
| 2008/0066148 A1 | 3/2008 | Lim |
| 2008/0083037 A1 | 4/2008 | Kruse |
| 2008/0084799 A1 | 4/2008 | Repasi |
| 2008/0098478 A1 | 4/2008 | Vaidya |
| 2008/0109871 A1 | 5/2008 | Jacobs |
| 2008/0114990 A1 | 5/2008 | Hilbert |
| 2008/0134163 A1 | 6/2008 | Golde |
| 2008/0141349 A1 | 6/2008 | Lyle |
| 2008/0235755 A1 | 9/2008 | Blaisdell |
| 2008/0282337 A1 | 11/2008 | Crawford |
| 2008/0307240 A1 | 12/2008 | Dahan |
| 2009/0019223 A1 | 1/2009 | Lection |
| 2009/0106556 A1 | 4/2009 | Hamid |
| 2009/0165132 A1 | 6/2009 | Jain |
| 2009/0249465 A1 | 10/2009 | Touboul |
| 2009/0253454 A1 | 10/2009 | Sampson |
| 2009/0254993 A1 | 10/2009 | Leone |
| 2010/0064341 A1 | 3/2010 | Aldera |
| 2010/0186093 A1 | 7/2010 | Aussel |
| 2010/0195833 A1 | 8/2010 | Priestley |
| 2010/0218012 A1 | 8/2010 | Joseph |
| 2010/0242109 A1 | 9/2010 | Lee |

(56) References Cited

U.S. PATENT DOCUMENTS

| | | |
|---|---|---|
| 2010/0251369 A1 | 9/2010 | Grant |
| 2010/0333088 A1 | 12/2010 | Rogel |
| 2011/0023118 A1 | 1/2011 | Wright |
| 2011/0154443 A1 | 6/2011 | Thakur |
| 2011/0154477 A1 | 6/2011 | Parla |
| 2011/0182180 A1 | 7/2011 | Riddle |
| 2011/0264931 A1 | 10/2011 | Chang |
| 2011/0268106 A1 | 11/2011 | Dalton, Jr. |
| 2012/0005756 A1 | 1/2012 | Hoefelmeyer |
| 2012/0054744 A1 | 3/2012 | Singh |
| 2012/0084831 A1 | 4/2012 | Hu |
| 2012/0110320 A1 | 5/2012 | Kumar |
| 2012/0149350 A1 | 6/2012 | Fan |
| 2012/0185846 A1 | 7/2012 | Recio |
| 2012/0216273 A1 | 8/2012 | Rolette |
| 2012/0233695 A1 | 9/2012 | Mahaffey |
| 2012/0239739 A1 | 9/2012 | Manglik |
| 2012/0240183 A1 | 9/2012 | Sinha |
| 2012/0240236 A1 | 9/2012 | Wyatt |
| 2013/0031601 A1 | 1/2013 | Bott |
| 2013/0074144 A1 | 3/2013 | Narayanaswamy |
| 2013/0091534 A1 | 4/2013 | Gilde |
| 2013/0097659 A1 | 4/2013 | Das |
| 2013/0097660 A1 | 4/2013 | Das |
| 2014/0032314 A1 | 1/2014 | Gieseke |
| 2014/0317679 A1 | 10/2014 | Wade |

FOREIGN PATENT DOCUMENTS

| | | |
|---|---|---|
| WO | 2006069041 | 6/2006 |
| WO | 2007110094 | 10/2007 |
| WO | 2008154726 | 12/2008 |
| WO | 2009004452 | 1/2009 |

OTHER PUBLICATIONS

Claessens, Joris et al., "(How) Can Mobile Agents Do Secure Electronic Transactions on Mobile Hosts? A Survey of the Security Issues and the Current Solutions," ACM Transactions on Internet Technology, vol. 3, No. 1, pp. 28-48, Feb. 2003.

CyberGuard Corporation, "Model 1: Wireless Mobile Security Appliance," located at http://support2.cyberguard.com/products/oem/model1.htm, 2005.

Entry, Inc., "CyberGuard Develops a Custom Mobile Security Appliance," SecurityProNews, located at http://www.securitypronews.com/news/securitynews/spn-45-20041007CyberGuardDevelo . . . , Oct. 7, 2004.

Kent, S. et al., "Security Architecture for the Internet Protocol," I.E.T.F. Network Working Group, RFC 4301, pp. 10-11, Dec. 2005.

PMC-Sierra, Inc., "MSP8120 Multi-Service Security Processor," Product Brief, 2007.

Prevelakis, Vassilis et al., "Drop-In Security for Distributed and Portable Computing Elements," Internet Research: Electronic Networking, Applications and Policy, vol. 13, No. 2, pp. 107-115, located at http://www.cs.columbia.edu/~angelos/Papers/InternetResearch-Final.pdf, 2003.

WatchGuard Technologies, Inc., "Mobile User VPN and PPTP," Internet Security Handbook, copyright 1998-2001, pp. 1-2, located at http://www.watchguard.com/help/lss/41/handbook/vpn3.htm, believe published Jun. 5, 2003.

ZyXEL Communications Corp., "ZyXEL Releases Worlds First Palm-Sized Portable Personal Firewall for Ultimate Security: ZyWALL P1 Pushes Network Security to the End-Point PC's with Minimum Administration Effort," ZyXEL News, located at http://global.zyxel.com/news/press.php?indexflag=20050310013432, Mar. 8, 2005.

European Patent Application No. 06821641.5, Examination Report dated Dec. 16, 2016.

European Patent Application No. 06821641.5, Search Report dated May 17, 2011.

European Patent Application No. 08847968.8, Search Report dated Oct. 25, 2011.

European Patent Application No. 13845746.0, Search Report dated Jun. 7, 2016.

International Application No. PCT/IL2006/001428, International Search Report and Written Opinion dated Jul. 15, 2008.

International Application No. PCT/IL2008/000740, International Search Report and Written Opinion dated Nov. 5, 2008.

International Application No. PCT/US2008/055942, International Search Report and Written Opinion dated Apr. 6, 2009.

International Application No. PCT/US2009/065204, International Search Report and Written Opinion dated Jan. 13, 2010.

International Application No. PCT/US2013/064161, International Search Report and Written Opinion dated Apr. 18, 2014.

International Application No. PCT/US2014/045826, International Search Report and Written Opinion dated Oct. 30, 2014.

International Application No. PCT/US2015/015970, International Search Report and Written Opinion dated May 28, 2015.

Fielding, R. et al., "Hypertext Transfer Protocol—HTTP/1.1," I.E.T.F. Network Working Group, RFC 2616, Jun. 1999.

Hall, Marty, "Core Web Programming: Chapter 16—The Hypertext Transfer Protocol," Prentice Hall PTR, ISBN 0-13-625666-X, pp. 867-911, Dec. 1997.

Hall, Marty, "More Servlets and JavaServer Pages: Chapter 2—A Fast Introduction to Basic Servlet Programming," Prentice Hall PTR, ISBN 0-13-067614-4, pp. 34-118, Dec. 1997.

Henmi, Anne et al., "Firewall Policies and VPN Configurations," Syngress Publishing, Inc., ISBN 1-59749-088-1, pp. 99-133, 291-313, Dec. 2006.

Jakobsson, Markus, "Invasive Browser Sniffing and Countermeasures," Proceedings of the 15th International Conference on World Wide Web, pp. 523-532, May 23, 2006.

Lee, Henry C.J. et al., "Port Hopping for Resilient Networks," IEEE 60th Vehicular Technology Conference (VTC2004), Sep. 26, 2004.

O'Brien, Kevin J., "Microsoft Hit by Antitrust Complaint for Browser," The International Herald Tribune, Dec. 14, 2007.

Sen, Subhabrata et al., "Accurate, Scalable In-Network, Identification of P2P Traffic Using Application Signatures," Proceedings of the 13th International Conference on World Wide Web, pp. 512-521, May 17, 2004.

Shreeve, Jimmy Lee, "Hasta la Vista, Microsoft!; It's Faster than Windows, It Fights Viruses—and It's Free," Independent Extra, Aug. 29, 2007.

Shuler, Rus, "How Does the Internet Work," white paper, 2002 [retrieved online at https://web.stanford.edu/class/msande91si/www-spr04/readings/week1/InternetWhitepaper.htm on Dec. 11, 2018].

Srisuresh, P. et al., "IP Network Address Translator (NAT) Terminology and Considerations," I.E.T.F. Network Working Group, RFC 2663, Aug. 1999.

Srisuresh, P. et al., "Traditional IP Network Address Translator (Traditional NAT)," I.E.T.F. Network Working Group, RFC 3022, Jan. 2001.

World Wide Web Consortium (W3C), "HTTP Request Fields," May 3, 1994 [retrieved online at https://web.archive.org/web/20060110150527/http://www.w3.org:80/Protocols/HTTP/HTRQ_Headers.html on Jan. 24, 2019].

\* cited by examiner

SYSTEM AND METHOD FOR PROVIDING DATA AND DEVICE SECURITY BETWEEN EXTERNAL AND HOST DEVICES

CROSS-REFERENCE TO RELATED APPLICATIONS

This application is a continuation of U.S. patent application Ser. No. 12/042,938, filed Mar. 5, 2008 and entitled "System and Method for Providing Data and Device Security Between External and Host Devices," which claims priority to U.S. Provisional Patent Application Ser. No. 60/893,109, filed Mar. 5, 2007 and entitled "Systems and Methods for Secured USB and Other Ports," which are hereby incorporated by reference herein. This application is also a continuation-in-part of U.S. patent application Ser. No. 11/376,919, filed Mar. 15, 2006 and entitled "System and Method for Providing Network Security to Mobile Devices," now U.S. Pat. No. 8,381,297, which claims priority to U.S. Provisional Patent Application Ser. No. 60/750,326, filed Dec. 13, 2005 and entitled "Personal Security Appliance," which are also hereby incorporated by reference herein.

TECHNICAL FIELD

This invention relates generally to computer security, and more particularly provides a system and method for providing data and device security between external and host devices.

BACKGROUND

The internet is an interconnection of millions of individual computer networks owned by governments, universities, nonprofit groups, companies and individuals. While the internet is a great source of valuable information and entertainment, the internet has also become a major source of system damaging and system fatal application code, such as "viruses," "spyware," "adware," "worms," "Trojan horses," and other malicious code.

To protect users, programmers design computer and computer-network security systems for blocking malicious code from attacking both individual and network computers. On the most part, network security systems have been relatively successful. A computer that connects to the internet from within an enterprise's network typically has two lines of defense. The first line of defense includes a network security system, which may be part of the network gateway, that includes firewalls, antivirus, antispyware and content filtering. The second line of defense includes individual security software on individual machines, which is not typically as secure as the network security system and is thus more vulnerable to attacks. In combination, the first and second lines of defense together provide pretty good security protection. However, when a device connects to the internet without the intervening network security system, the device loses its first line of defense. Thus, mobile devices (e.g., laptops, desktops, PDAs such as RIM's Blackberry, cell phones, any wireless device that connects to the internet, etc.) when traveling outside the enterprise network are more vulnerable to attacks.

FIG. 1 illustrates an example network system 100 of the prior art. Network system 100 includes a desktop 105 and a mobile device 110, each coupled to an enterprise's intranet 115. The intranet 115 is coupled via a network security system 120 (which may be a part of the enterprise's gateway) to the untrusted internet 130. Accordingly, the desktop 105 and mobile device 110 access the internet 130 via the network security system 120. A security administrator 125 typically manages the network security system 120 to assure that it includes the most current security protection and thus that the desktop 105 and mobile device 110 are protected from malicious code. Demarcation 135 divides the trusted enterprise 140 and the untrusted public internet 130. Because the desktop 105 and the mobile device 110 are connected to the internet 130 via the network security system 120, both have two lines of defense (namely, the network security system 120 and the security software resident on the device itself) against malicious code from the internet 130. Of course, although trusted, the intranet 115 can also be a source of malicious code.

FIG. 2 illustrates an example network system 200 of the prior art, when the mobile device 110 has traveled outside the trusted enterprise 140 and reconnected to the untrusted internet 130. This could occur perhaps when the user takes mobile device 110 on travel and connects to the internet 130 at a cybercafe, at a hotel, or via any untrusted wired or wireless connection. Accordingly, as shown, the mobile device 110 is no longer protected by the first line of defense (by the network security system 120) and thus has increased its risk of receiving malicious code. Further, by physically bringing the mobile device 110 back into the trusted enterprise 140 and reconnecting from within, the mobile device 110 risks transferring any malicious code received to the intranet 115.

As the number of mobile devices and the number of attacks grow, mobile security is becoming increasingly important. The problem was emphasized in the Info-Security Conference in New York on Dec. 7-8, 2005. However, no complete solutions were presented.

Similarly, when a host device is connected to an external device such as a USB flash drive, iPod, external hard drive, etc., both devices are vulnerable to receipt of malicious code or transfer of private data. FIG. 11 illustrates an example prior art data exchange system 1100 that includes a host computer (host) 1105 and an external device 1110. The host 1105 includes an external device (ED) port 1115, such as a USB port, for receiving the external device 1110. The host 1105 also includes ED drivers 1120 for performing enumeration and enabling communications between the external device 1110 and the host 1105. The external device 1110 includes an ED plug, such as a USB plug, for communicating with the ED port 1115. Both of the host 1105 and external device 1110 are vulnerable to receipt of malicious code or transfer of private data.

Accordingly, there is a need for a system and method of providing security to host and external devices.

SUMMARY

Per one embodiment, the present invention provides a security device comprising an external device plug operative to communicatively couple with a host; an external device port operative to communicatively couple with an external device; a processor; and memory storing an operating system, an external device driver operative to control communication with the external device, and a security engine operative to enforce a security policy on a data transfer request between the external device and the host. The security device may be operative with a driver on the host. At least one of the external device plug and the external device port may follow a USB standard. At least one of the external device plug and the external device port may include a wireless connection. The security engine may protect against the transfer of at least one of viruses, spyware and adware. The security engine may protect against the unauthorized transfer of private data.

Per one embodiment, the present invention provides a secure data exchange system, comprising a security device including a first external device plug, and a security engine operative to enforce a security policy on data transfer requests received from the host; an external device including a second external device plug; and a host including a first external device port operative to communicatively couple with the first external device plug, a second external device port operative to communicatively couple with the second external device plug, and a redirect driver operative to transfer a data transfer request from the host to the security device before executing the data transfer request. The external device may include a USB drive. The external device may include one of a PDA or a cell phone. The host may include one of a laptop, desktop, PDA or cell phone. The host may launch the redirect driver upon detecting connection of the secure device to the host.

Per one embodiment, the present invention may provide a method comprising communicatively coupling a security device to a host; communicatively coupling an external device to the security device; receiving by the security device a data transfer request from the host; and enforcing by the security device a security policy on the data transfer request before allowing the data transfer request to be performed. The communicatively coupling a security device to a host may include using a wired or wireless connection. The communicatively coupling an external device to the host may include using a wired or wireless connection. The data transfer request may include a request to transfer data from the host to the external device. The data transfer request may include a request to transfer data from the external device to the host. The enforcing may include reviewing the data being transferred for at least one of viruses, spyware and adware. The enforcing may include determining whether the data transfer request includes a request for private data. The enforcing may include requiring an additional security check before allowing the transfer of private data.

Per one embodiment, the present invention provides a method, comprising communicatively coupling a security device to a host; communicatively coupling an external device to the host; receiving by the host a data transfer request; using a redirect driver on the host to redirect the data transfer request to the security device; and enforcing by the security device a security policy on the data transfer request before allowing the data transfer request to be performed. The communicatively coupling a security device to a host may include using a wired or wireless connection. The communicatively coupling an external device to the host may include using a wired or wireless connection. The data transfer request may include a request to transfer data from the host to the external device. The data transfer request may include a request to transfer data from the external device to the host. The enforcing may include reviewing the data being transferred for at least one of viruses, spyware and adware. The enforcing may include determining whether the data transfer request includes a request for private data. The enforcing may include requiring an additional security check before allowing the transfer of private data.

DETAILED DESCRIPTION

The following description is provided to enable any person skilled in the art to make and use the invention, and is provided in the context of a particular application and its requirements. Various modifications to the embodiments may be possible to those skilled in the art, and the generic principles defined herein may be applied to these and other embodiments and applications without departing from the spirit and scope of the invention. Thus, the present invention is not intended to be limited to the embodiments shown, but is to be accorded the widest scope consistent with the principles, features and teachings disclosed herein.

An embodiment of the present invention uses a small piece of hardware that connects to a mobile device and filters out attacks and malicious code. The piece of hardware may be referred to as a "mobile security system" or "personal security appliance." Using the mobile security system, a mobile device can be protected by greater security and possibly by the same level of security offered by its associated corporation/enterprise.

Figure 1:
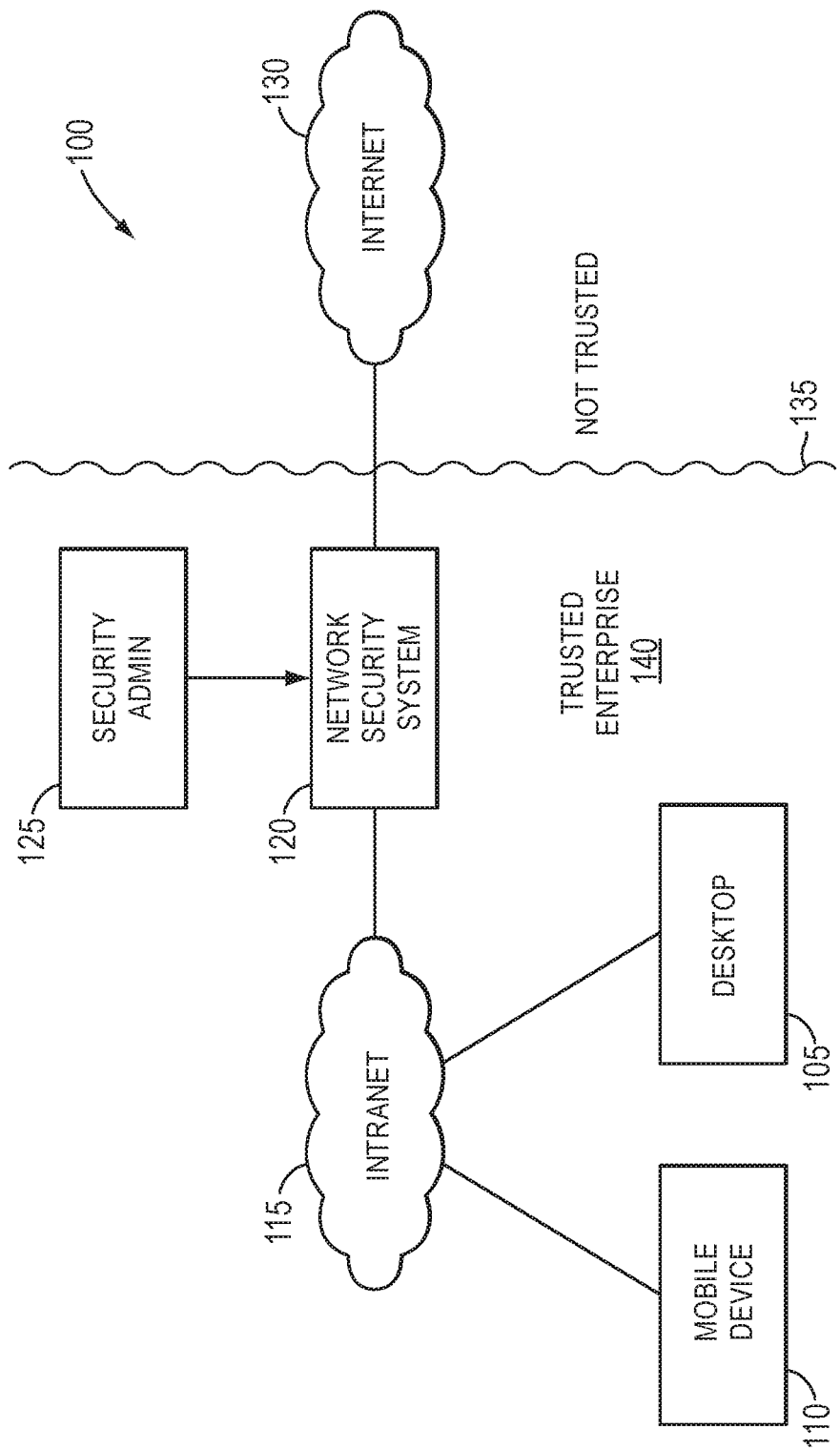
FIG. 1 is a block diagram of a prior art network system in a first state.
Figure 2:
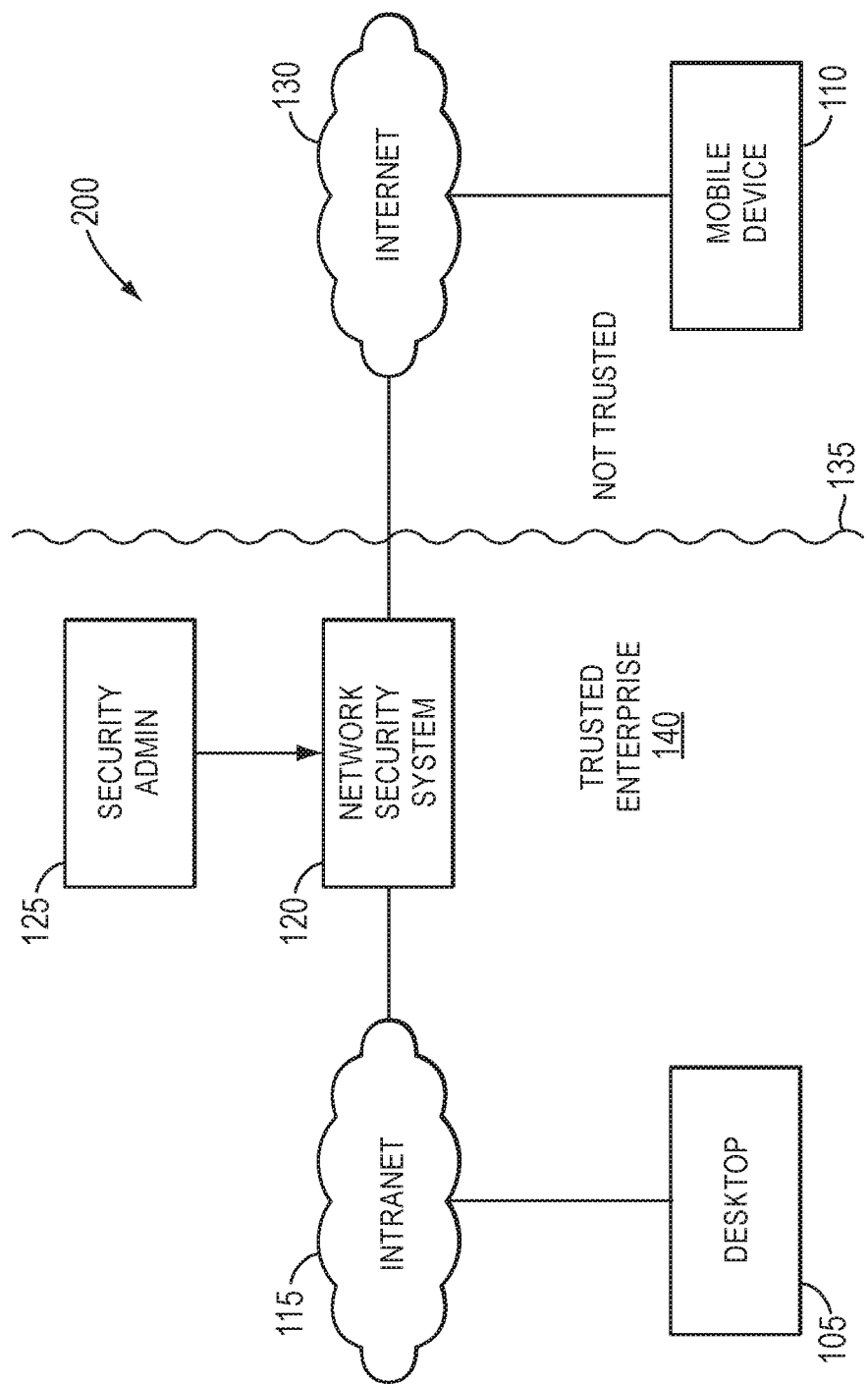
FIG. 2 is a block diagram of a prior art network system in a second state.
Figure 3:
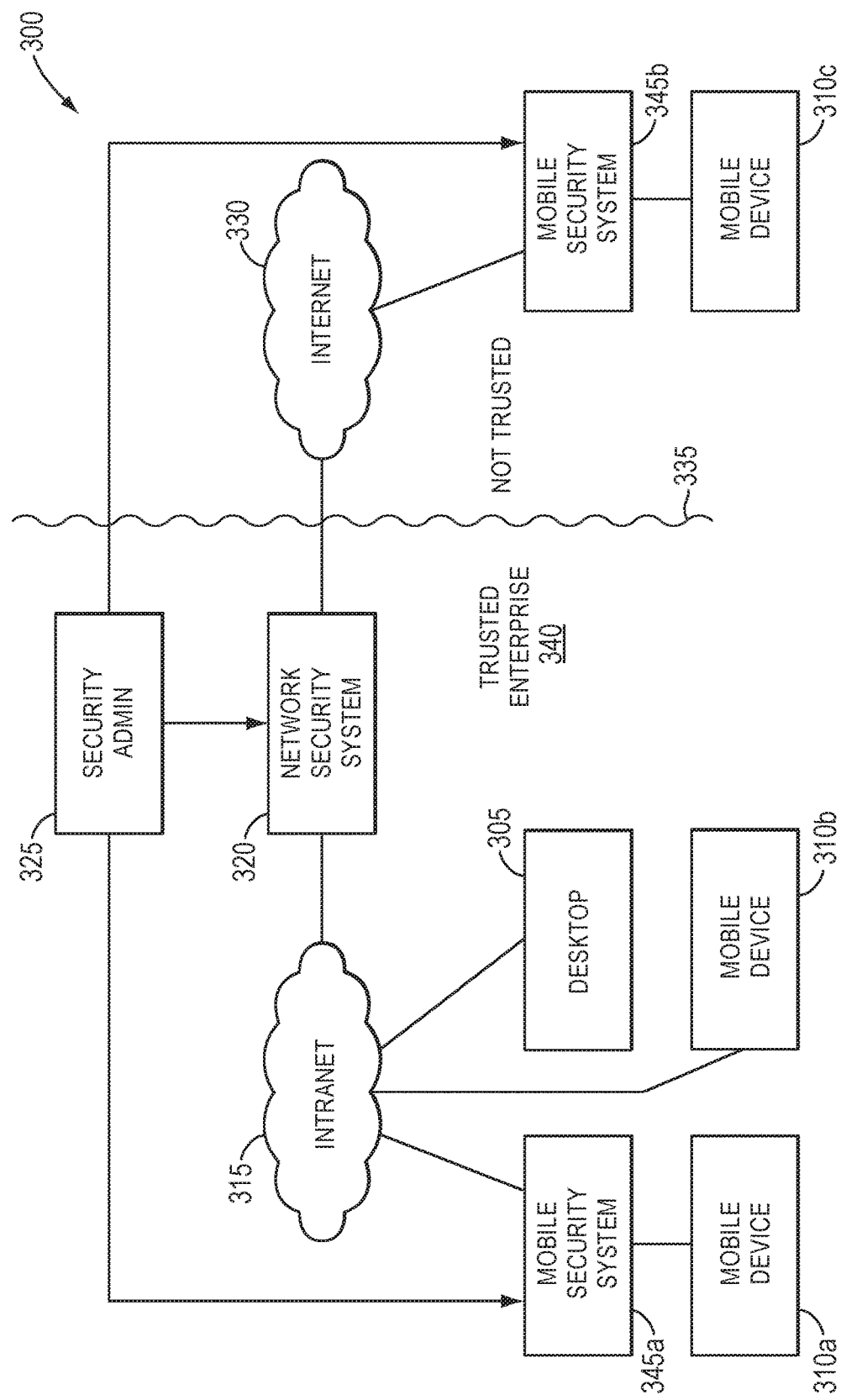
FIG. 3 is a block diagram of a network system in accordance with an embodiment of the present invention.

FIG. 3 illustrates a network system 300 in accordance with an embodiment of the present invention. Network system 300 includes a desktop 305, a first mobile device 310*a*, and a second mobile device 310*b*. The first mobile device 310*a* is illustrated as within the enterprise network 340 at this time and is coupled via a mobile security system 345*a* to the enterprise's intranet 315. The desktop 305 and second mobile device 310*b* are also within the enterprise network 340 but in this embodiment are coupled to the intranet 315 without an intervening mobile security system 345 such as mobile security system 345*b*. The intranet 315 is coupled via a network security system 320 (which may be part of the enterprise's gateway) to the untrusted internet 330. Accordingly, the first mobile device 310*a*, the second mobile device 310*b* and the desktop 305 access the untrusted internet 330 via the network security system 320. Each may also be protected by a personal security system resident thereon (not shown). A third mobile device 310*c* is currently outside the enterprise network 340 and is coupled via a mobile security system 345*b* to the untrusted internet 330. The third mobile device 310 may be in use by an employee of the trusted enterprise 340 who is currently on travel. A security administrator 325 manages the mobile security system 345*a*, the mobile security system 345*b*, and the network security system 320 to assure that they include the most current security protection. One skilled in the art will recognize that the same security administrator need not manage the various devices. Further, the security administrator could be the user and need not be within the trusted enterprise 340.

Demarcation 335 divides the trusted enterprise 340 and the untrusted publicly accessible internet 330. Each of mobile device 310*a*, 310*b* and 310*c* may be referred to generically as mobile device 310, although they need not be identical. Each mobile security system 345*a* and 345*b* may be referred to generically as mobile security system 345, although they need not be identical.

As shown, although the mobile device 310*c* has traveled outside the trusted enterprise 340, the mobile device 310*c* connects to the untrusted internet 330 via the mobile security system 345*b* and thus retains two lines of defense (namely, the mobile security system 345*b* and the security software resident on the device itself). In this embodiment, the mobile security system 345 effectively acts as a mobile internet gateway on behalf of the mobile device 310*c*. In an embodiment, the mobile security system 345 may be a device dedicated to network security. In an embodiment, each mobile security system 345 may support multiple mobile devices 310, and possibly only registered mobile devices 310, e.g., those belonging to enterprise 340.

Each mobile security system 345 (e.g., 345*a*, 345*b*) may be a miniature server, based on commercial hardware (with Intel's Xscale as the core), Linux OS and network services, and open-source firewall, IDS/IPS and antivirus protection. The mobile security system 345 may be based on a hardened embedded Linux 2.6.

In this embodiment, because the security administrator 325 is capable of remotely communicating with the mobile security system 345*b*, IT can monitor and/or update the security policies/data/engines implemented on the mobile security system 345*b*. The security administrator 325 can centrally manage all enterprise devices, remotely or directly. Further, the security administrator 325 and mobile security systems 345 can interact to automatically translate enterprise security policies into mobile security policies and configure mobile security systems 345 accordingly. Because the mobile security system 345 may be generated from the relevant security policies of the enterprise 340, the mobile device 310*c* currently traveling may have the same level of protection as the devices 305/310 within the trusted enterprise 340.

Figure 8:
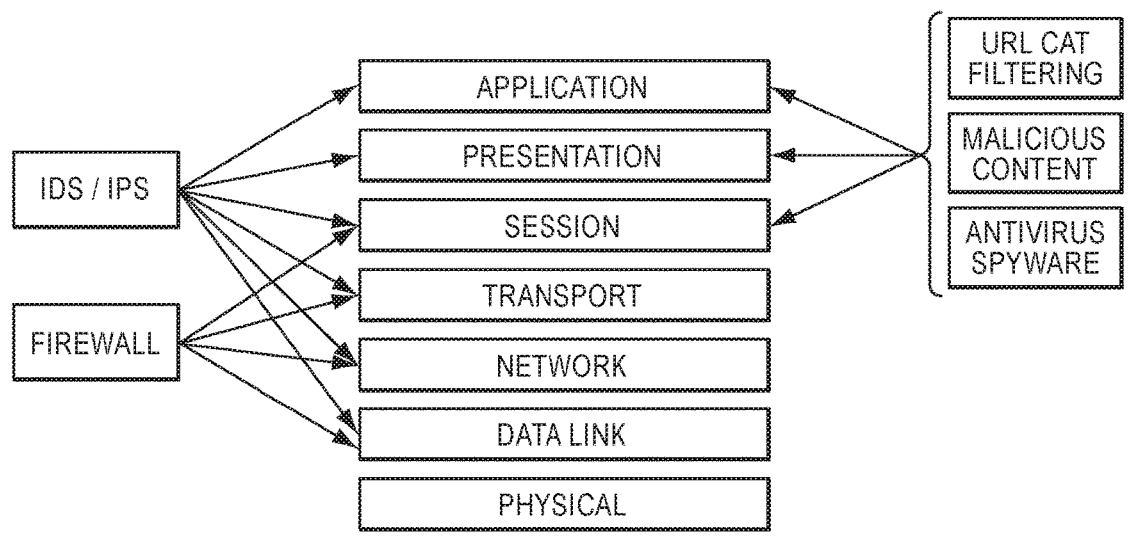
FIG. 8 is a block diagram illustrating details of network security measures relative to the OSI layers.

The mobile security system 345 may be designed as an add-on to existing software security or to replace all security hardware and software on a traveling mobile device. These security applications will preferably operate on different OSI layers to provide maximum security and malicious code detection, as shown in the example system illustrated in FIG. 8. Operating on the lower OSI layers and doing TCP/IP packets analysis only (by screening firewall or router packets) would miss virus and/or worm behavior. Also, many modern viruses use mobile code implemented on a "higher" level than the $7^{th}$ OSI layer (Application—HTTP, FTP, etc.) and therefore cannot be interpreted at the packet layer nor at the application layer. For example, applying antivirus analysis only at the session or transport layer on a malicious Java Script (that is included in an HTML page), trying to match the signature with packets and without understanding the content type (Java Script), will not detect the malicious nature of the Java Script. To offer greater protection, the mobile security system 345 may act as corporate class security appliance and engage different security applications based on the content type and the appropriate OSI layers, (or even a "higher" level if content is encapsulated in the application layer). The mobile security system 345 may be configured to perform content analysis at different OSI layers, e.g., from the packet level to the application level. It will be appreciated that performing deep inspection at the application level is critical to detect malicious content behavior and improve detection of viruses, worms, spyware, Trojan horses, etc. The following software packages may be implemented on the mobile security system 345: Firewall and VPN—including stateful and stateless firewalls, NAT, packet filtering and manipulation, DOS/DDOS, netfilter, isolate user mobile devices from the internet and run VPN program on the device, etc. Optional web accelerator and bandwidth/cache management based on Squid. IDS/IPS—Intrusion detection and prevention system based on Snort. Snort is an open source network intrusion prevention and detection system utilizing a rule-driven language, which combines the benefits of signature, protocol- and anomaly-based inspections. Antivirus and antispyware based on ClamAV; additional AV and AS engines, e.g., McAfee, Kaspersky, Pandamay, may be offered for additional subscription fees. Malicious Content Detection—on the fly heuristics that perform content analysis to detect malicious content before having signatures. This will be based on a rule base and updated rules and will be content dependent scanning. URL Categorization Filtering—based on a commercial engine, such as Surfcontrol, Smart Filters or Websense. May provide around 70 categories of URLs such as gambling, adult content, news, webmail, etc. The mobile device 345 may apply different security policies based on the URL category, e.g., higher restriction and heuristics for Gambling or Adult content web sites, etc.

Figure 4:
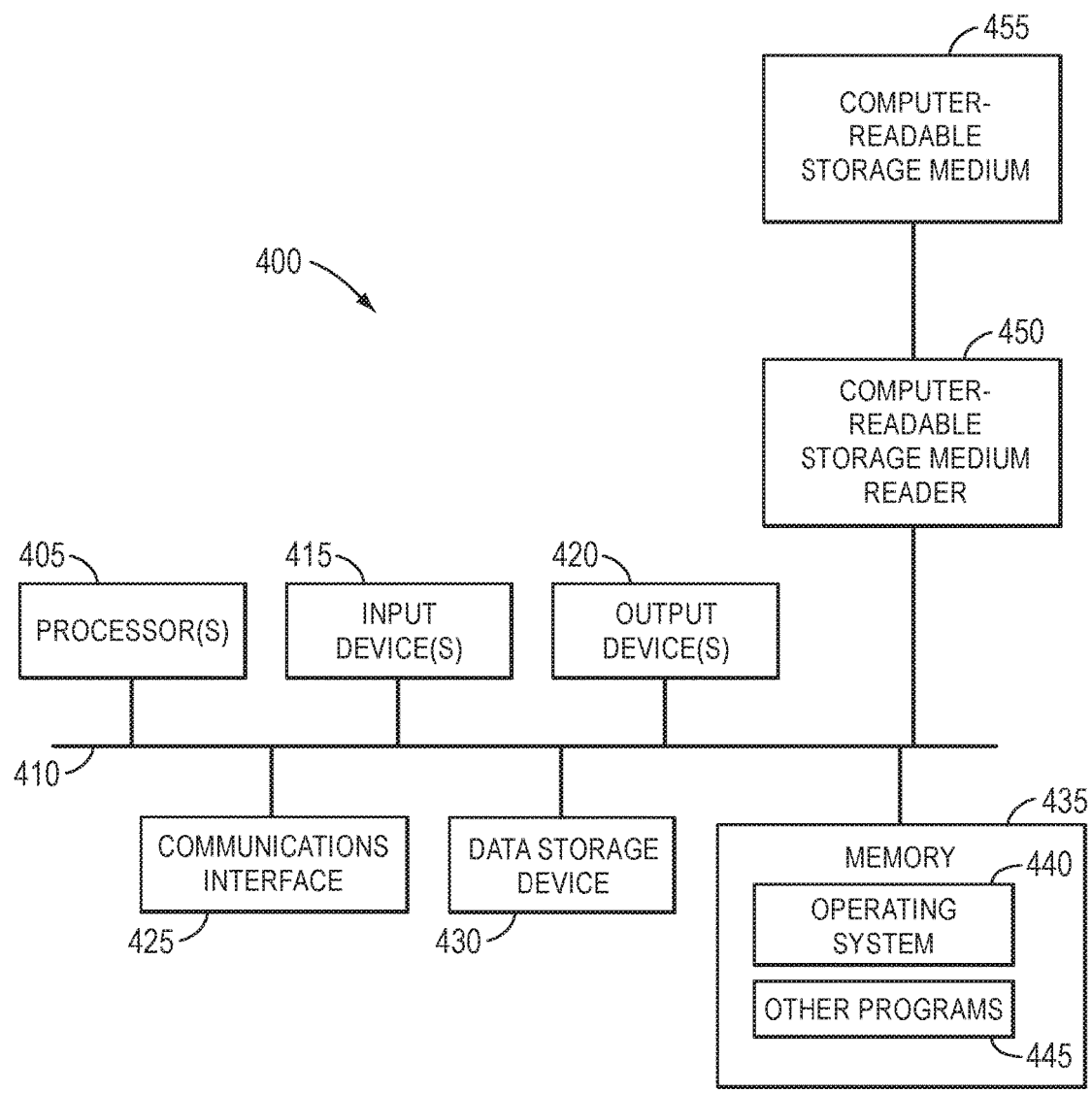
FIG. 4 is a block diagram illustrating details of a computer system in accordance with an embodiment of the present invention.

FIG. 4 is a block diagram illustrating details of an example computer system 400, of which each desktop 305, mobile device 310, network security system 320, mobile security system 345, and security administrator 325 may be an instance. Computer system 400 includes a processor 405, such as an Intel Pentium® microprocessor or a Motorola Power PC® microprocessor, coupled to a communications channel 410. The computer system 400 further includes an input device 415 such as a keyboard or mouse, an output device 420 such as a cathode ray tube display, a communications device 425, a data storage device 430 such as a magnetic disk, and memory 435 such as Random-Access Memory (RAM), each coupled to the communications channel 410. The communications interface 425 may be coupled directly or via a mobile security system 345 to a network such as the internet. One skilled in the art will recognize that, although the data storage device 430 and memory 435 are illustrated as different units, the data storage device 430 and memory 435 can be parts of the same unit, distributed units, virtual memory, etc.

The data storage device 430 and/or memory 435 may store an operating system 440 such as the Microsoft Windows XP, the IBM OS/2 operating system, the MAC OS, UNIX OS, LINUX OS and/or other programs 445. It will be appreciated that a preferred embodiment may also be implemented on platforms and operating systems other than those mentioned. An embodiment may be written using JAVA, C, and/or C++ language, or other programming languages, possibly using object oriented programming methodology.

One skilled in the art will recognize that the computer system 400 may also include additional information, such as network connections, additional memory, additional processors, LANs, input/output lines for transferring information across a hardware channel, the internet or an intranet, etc. One skilled in the art will also recognize that the programs and data may be received by and stored in the system in alternative ways. For example, a computer-readable storage medium (CRSM) reader 450 such as a magnetic disk drive, hard disk drive, magneto-optical reader, CPU, etc. may be coupled to the communications bus 410 for reading a computer-readable storage medium (CRSM) 455 such as a magnetic disk, a hard disk, a magneto-optical disk, RAM, etc. Accordingly, the computer system 400 may receive programs and/or data via the CRSM reader 450. Further, it will be appreciated that the term "memory" herein is intended to cover all data storage media whether permanent or temporary.

Figure 5:
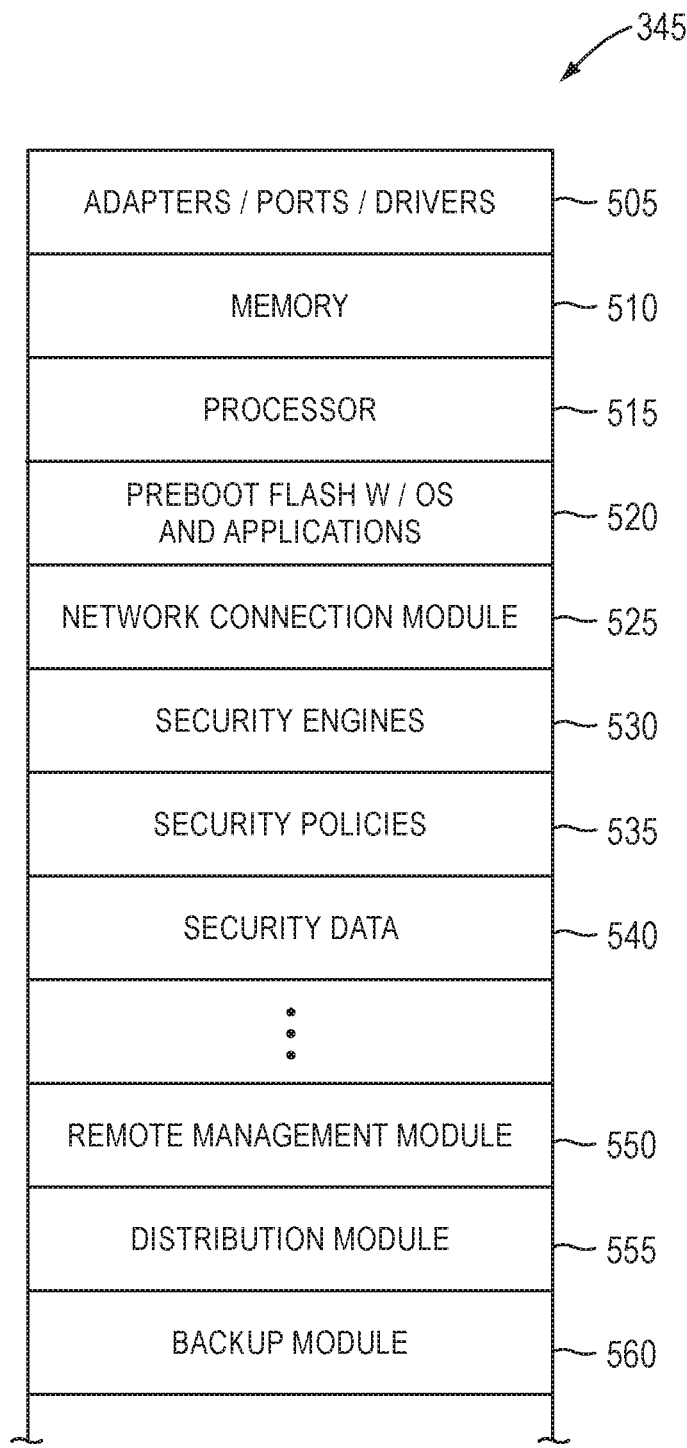
FIGS. 5 and 5A are block diagrams illustrating details of the mobile security system in accordance with an embodiment of the present invention.

FIG. 5 is a block diagram illustrating details of the mobile security system 345 in accordance with an embodiment of the present invention. Mobile security system 345 includes adapters/ports/drivers 505, memory 510, a processor 515, a preboot flash/ROM memory module 520 storing a secure version of the mobile security system's operating system and other applications, network connection module 525, security engines 530, security policies 535, security data 540, remote management module 550, distribution module 555, and backup module 560. Although these modules are illustrated as within the mobile security system 345, one skilled in the art will recognize that many of them could be located elsewhere, e.g., on the security administrator 325 or on third-party systems in communication with the mobile security system 345. The mobile security system 345 may be in a pocket-size, handheld-size or key-chain size housing, or possibly smaller. Further, the mobile security system 345 may be incorporated within the mobile device 310.

The adapters/ports/drivers 505 include connection mechanisms (including software, e.g., drivers) for USB, Ethernet, WiFi, WiMAX, GSM, CDMA, Bluetooth, PCMCIA and/or other connection data ports on the mobile security system 345. In one embodiment, the adapters/ports/drivers 505 may be capable of connection to multiple devices 310 to provide network security to the multiple devices 310.

Memory 510 and processor 515 execute the operating system and applications on the mobile security system 345. In this example, the preboot flash 520 stores the operating system and applications. At boot time, the operating system and applications are loaded from the preboot flash 520 into memory 510 for execution. Since the operating system and applications are stored in the preboot flash 520, which cannot be accessed during runtime by the user, the operating system and applications in the preboot flash 520 are not corruptible. Should the copy of the operating system and applications in memory 510 be corrupted, e.g., by malicious code, the operating system and applications may be reloaded into the memory 510 from the preboot flash 520, e.g., upon restart. Although described as stored within the preboot flash 520, the OS and applications can be securely stored within other read-only memory devices, such as ROM, PROM, EEPROM, etc.

Figure 5A:
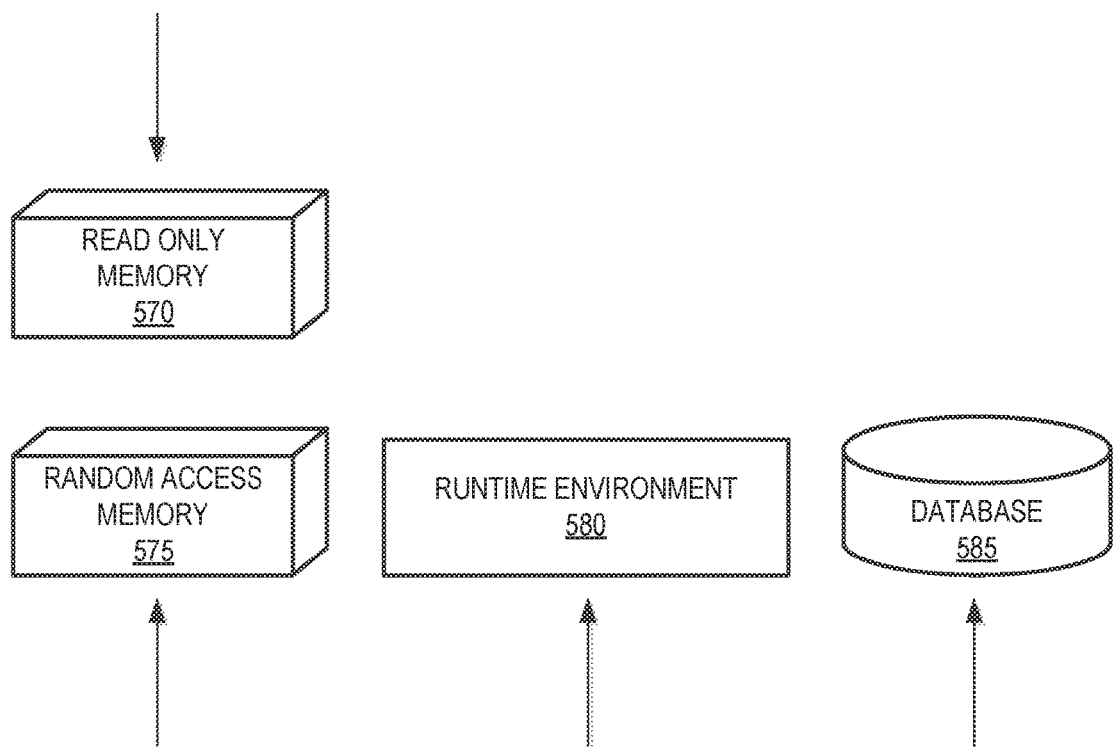

As shown in FIG. 5A, memory (including memory 510 and preboot flash 520) on the mobile security system 345 may be divided into the following zones: read only memory 570; random access memory 575 for storing a copy of the OS, kernel and security applications; runtime environment 580; and database 585 for storing application data, log files, etc.

Upon each "hard" restart, the boot loader (resident in read only memory 570) of the mobile security system 345 copies the kernel and security applications (a fresh unchanged copy) from read only memory 570 to random access memory 575. This causes a clean version of the OS and applications to be loaded into random access memory 575 each time. That way, if a specialized attack on mobile security system 345 is developed, the attack will be unable to infect the system, since the OS and applications are precluded from accessing read only memory 570 during runtime. Further, any attack that does reach memory 510 will be able to run only once and will disappear upon a hard restart. A triggering mechanism may be available to restart the mobile security system 345 automatically upon infection detection.

The network connection module 525 enables network connection, e.g., to the internet 330 or the intranet 315 via network communication hardware/software including WiFi, WiMAX, CDMA, GSM, GPRS, Ethernet, modem, etc. For example, if the mobile device 310 wishes to connect to the internet 330 via a WiFi connection, the adapters/ports/drivers 505 may be connected to the PCI port, USB port or PCMCIA port of the mobile device 310, and the network connection module 525 of the mobile security system 345 may include a WiFi network interface card for connecting to wireless access points. Using the network connection module 425, the mobile security system 345 may communicate with the network as a secure gateway for the mobile device 310. Other connection architectures are described in FIGS. 10A-10C.

The security engines 530 execute security programs based on the security policies 535 and on security data 540, both of which may be developed by IT managers. Security engines 530 may include firewalls, VPN, IPS/IDS, antivirus, antispyware, malicious content filtering, multilayered security monitors, Java and bytecode monitors, etc. Each security engine 530 may have dedicated security policies 535 and security data 540 to indicate which procedures, content, URLs, system calls, etc. the engines 530 may or may not allow. The security engines 530, security policies 535 and security data 540 may be the same as, a subset of, and/or developed from the engines, policies and data on the network security system 320.

To provide a higher security level provided by antivirus and antispyware software, the security engines 530 on each mobile security system 345 may implement content analysis and risk assessment algorithms. Operating for example at OSI Layer 7 and above (mobile code encapsulated within Layer 7), these algorithms may be executed by dedicated High Risk Content Filtering (HRCF) that can be controlled by a rules engine and rule updates. The HRCF will be based on a powerful detection library that can perform deep content analysis to verify real content types. This is because many attacks are hidden within wrong mime types and/or may use sophisticated tricks to present a text file type to a dangerous active script or ActiveX content type. The HRCF may integrate with a URL categorization security engine 530 for automatic rule adjustment based on the URL category. In one embodiment, when the risk level increases (using the described mechanism) the mobile security system 345 may automatically adjust and increase filtering to remove more active content from the traffic. For example, if greater risk is determined, every piece of mobile code, e.g., Java script, VB script, etc. may be stripped out.

Three aspects for integration with corporate policy server legacy systems include rules, LDAP and active directory, and logging and reporting as discussed below. In one embodiment, a policy import agent running on the security administrator 325 will access the rule base of Checkpoint Firewall-1 and Cisco PIX Firewalls and import them into a local copy. A rule analysis module will process the important rules and will offer out-of-the-box rules and policies for mobile security systems 345. This proposed policy will offer all mobile security systems 345 a best fit of rules that conform the firewall policy of the enterprise 340. The agent will run periodically to reflect any changes and generate updates for mobile security system 345 policies 535. The LDAP and Active Directory may be integrated with the directory service to maintain mobile security system 345 security policies 535 that respond to the enterprise's directory definitions. For example, a corporate policy for LDAP user Group "G" may automatically propagate to all mobile security systems 345 in "G" group. Mobile security system 345 local logs and audit trails may be sent in accordance to a logging and reporting policy to a central log stored at the security administrator 325. Using a web interface, IT may be able to generate reports and audit views related to all mobile device 310 users, their internet experiences, and attempts to bring infected devices back to the enterprise 340. IT will be able to forward events and log records into legacy management systems via SYSLOG and SNMP Traps.

The security engines 530 may perform weighted risk analysis. For example, the security engine 530 may analyze HTTP, FTP, SMTP, POP3, IM, P2P, etc. including any traffic arriving from the internet 330. The security engine 530 may assign a weight and rank for every object based on its type, complexity, richness in abilities, source of the object, etc. The security engine 530 may assign weight based on the source using a list of known dangerous or known safe sources. The security engine 530 may assign weight to objects based on the category of the source, e.g., a gambling source, an adult content source, a news source, a reputable company source, a banking source, etc. The security engine 530 may calculate the weight, and based on the result determine whether to allow or disallow access to the content, the script to run, the system modification to occur, etc. The security engine 530 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

In some embodiments, the security engines 530, security policies 535 and security data 540 may enable bypassing the mobile security system 345. The security policy 535, set by the security administrator 325, may include a special attribute to force network connection through the mobile security system 325 when outside the trusted enterprise 340. Thus, if this attribute is set "on," when a mobile device 310 attempts to connect to the internet 330 without the mobile security system 345 and not from within the trusted enterprise 340, all data transfer connections including LAN connection, USB-net, modem, Bluetooth, WiFi, etc. may be closed. The mobile device 310 may be totally isolated and unable to connect to any network, including the internet 330.

Figure 6:
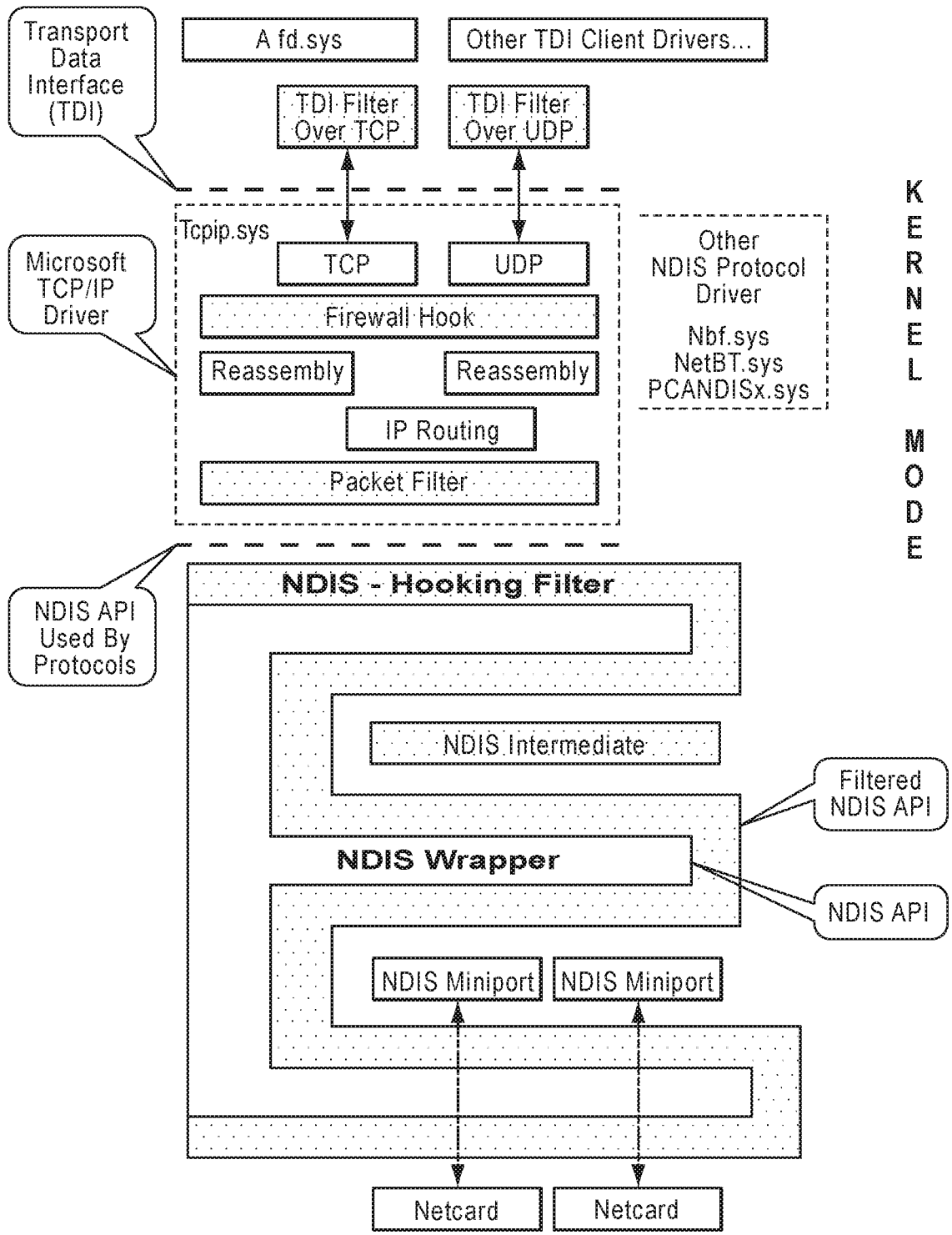
FIG. 6 is a block diagram illustrating details of the mobile security system in accordance with a Microsoft Window's embodiment.

In one embodiment, to enable this, when first connecting the mobile security system 345 to the mobile device 310 using for example the USB cable (for both power and USB connection creation), the USB plug & play device driver will be sent into the mobile device 310. The installed driver may be "Linux.inf" which allows a USB-net connection for the mobile security system 345. This connection allows the mobile security system 345 to access the internet 330 via the USB port and using the mobile device 310 network connection plus additional code ("the connection client"). In a Windows example, the connection client may be installed at the NDIS level of the mobile device 310 above all the network interface cards of every network connection as shown in FIG. 6. The implementation will be as an NDIS Intermediate (IM) Driver or NDIS-Hooking Filter Driver. Both implementations may be at the kernel level, so that an end user cannot stop or remove it. When starting the mobile device 310, the connection client may attempt to connect to the security administrator 325 or the network security system 320 locally within the trusted enterprise 340. If the node is not found (finding via VPN is considered as not found in local LAN), the connection client will assume it is working from outside the trusted enterprise 340 and expects to find the mobile security system 345 connected, e.g., via USB-net or other connection mechanism. If the mobile security system 345 is not found, the connection client may avoid any communication to any network connection. By a policy definition, this behavior can be modified to allow communication to the enterprise 340 via VPN installed in the mobile device 310. Similarly, in case of a mobile device system 345 failure, all traffic may be disabled, except for the VPN connection into the enterprise 340.

It will be appreciated that NDIS is one possible implementation of intercepting traffic at the kernel level. For example, in another embodiment, the system may hook Winsock or apply other ways that may be in future Windows versions.

In an embodiment where the mobile security system 345 supports multiple mobile devices 310, the security engines 530, security policies 535 and security data 540 may be different for each mobile device 310 (e.g., based on for example user preferences or IT decision). Alternatively, it can apply the same engines 530, policies 535 and data 540 for all connected devices 310.

The remote management module 550 enables communication with security administrator 325 (and/or other security administrators), and enables local updating of security engines 530, security policies 535, security data 540 including signatures and other applications. In one embodiment, modification to the security policies 535 and data 540 can be done by the security administrator 325 only. The remote management module 550 of the mobile security system 345 may receive updates from an update authorities device (UAD), e.g., on the security administrator 325 via a secured connection. A UAD may operate on an update server at a customer IT center located on the internet 330 to forward updates to mobile security systems 345 that possibly do not belong to an enterprise 540 in charge of managing updates. A UAD may operate on a mobile security system 345. Security engine 530 updates may modify the antivirus engine DLL, etc. OS and security application updates may be implemented only from within the enterprise 540 while connecting to the security administrator 325 and via an encrypted and authenticated connection.

The security administrator 325 can modify URL black and white lists for remote support to traveling users. In case of false positives, the security administrator 325 may allow access to certain URLs, by bypassing the proactive heuristics security but still monitoring by firewall, antivirus, IPS/IDS, etc. Additional remote device-management features may enable the security administrator 325 to perform remote diagnostics, access local logs, change configuration parameters, etc. on the mobile security system 345. The security administrator 325 may delegate tasks to a helpdesk for support.

Figure 7:
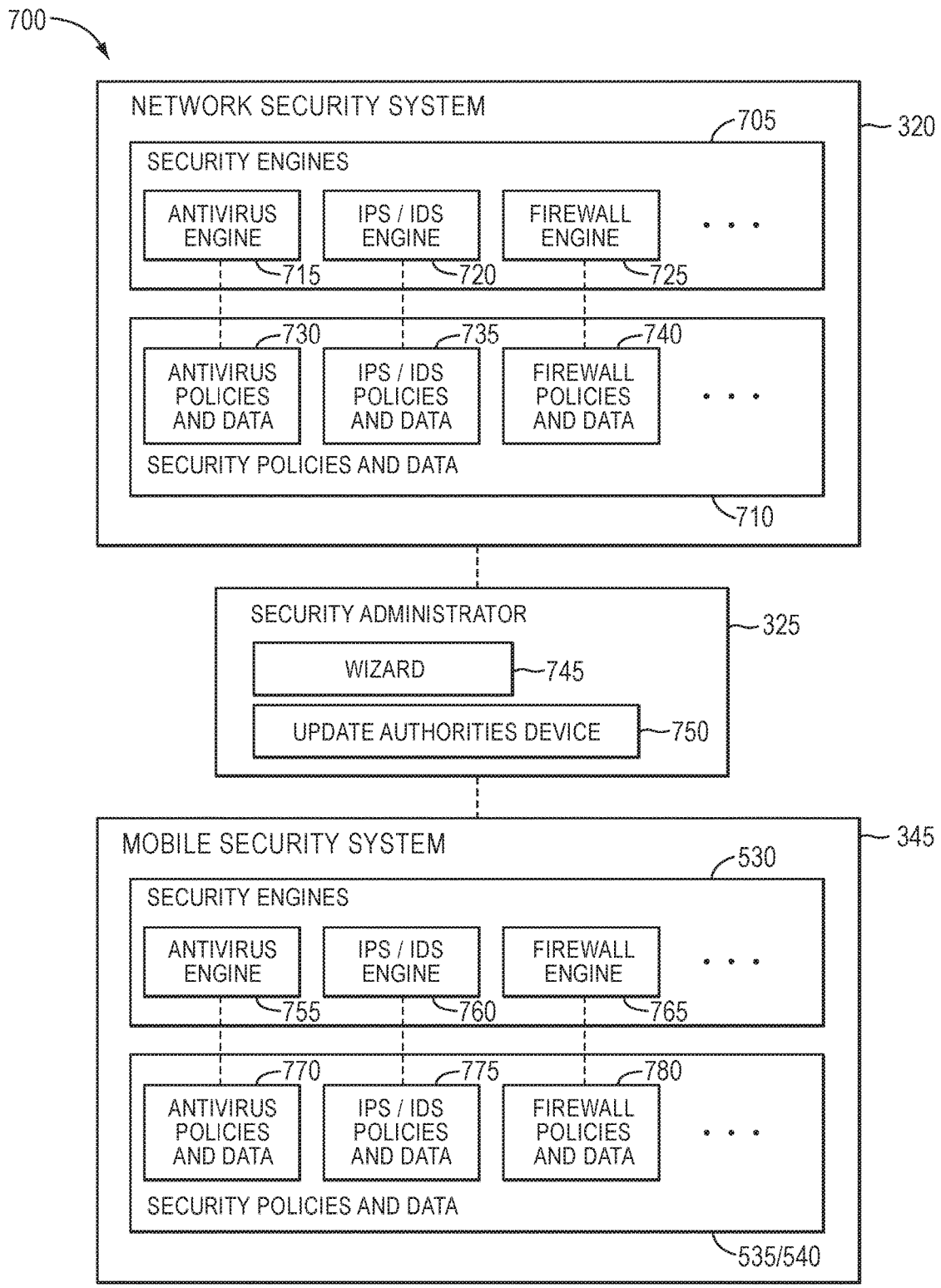
FIG. 7 is a block diagram illustrating details of a smart policy updating system in accordance with an embodiment of the present invention.

The remote management module 550 may communicate with a wizard (e.g., wizard 745), which may be on the security administrator 325, as illustrated in FIG. 7, or on another system. Details of the wizard 745 and details of the communication schemes between the remote management module 550 and the wizard 745 are described below with reference to FIG. 7.

The distribution module 555 enables distribution of updates, e.g., security policy 535 updates including rule updates, security data 540 updates including signature updates, security engine 530 updates, application/OS updates, etc. by the mobile security system 345 to N other mobile security systems 345. A routing table identifying the N other mobile security systems 345 to whom to forward the updates may be provided to the distribution module 555 to enable system 345 to system 345 communication. Updates may be implemented according to policies set by the security administrator 325. When forwarding updates, the distribution module 555 acts as a UAD.

Each mobile security system 345 may obtain its routing table with security information updates, periodically, at predetermined times, upon login, etc. The routing tables may be maintained on a server, e.g., the security administrator 325 or another mobile security system 345. In one embodiment, the mobile security systems 345 may contact the server to retrieve the routing tables. Alternatively, the server may push the routing tables to the mobile security systems 345.

Figure 9:
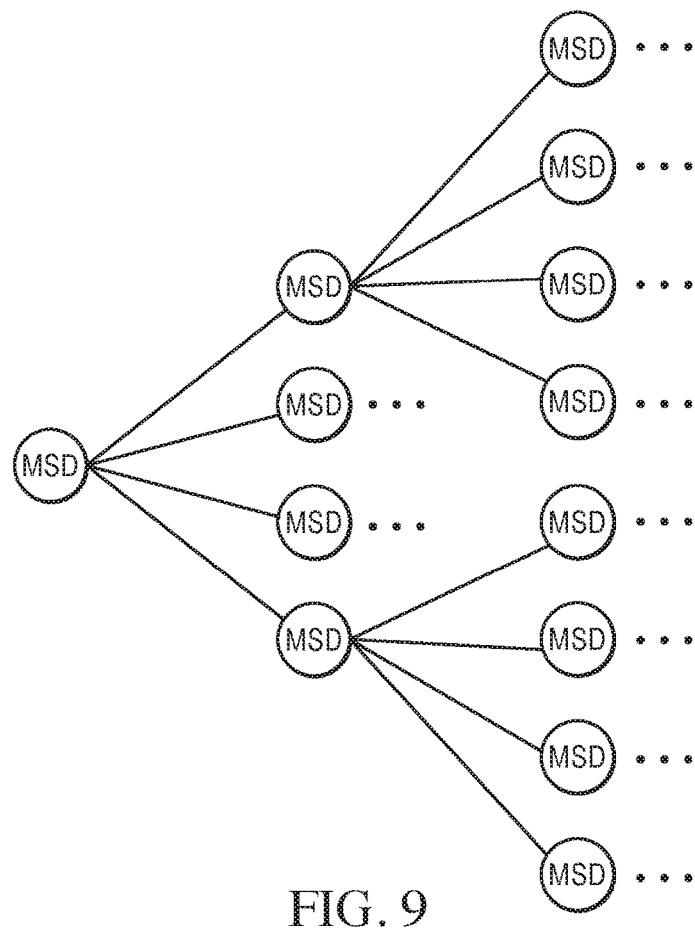
FIG. 9 is a block diagram illustrating details of the communication technique for spreading security code to the mobile security systems.

The distribution module 555 may enable rapid updates as shown in FIG. 9. Currently, all commercial antivirus products available do not update devices faster than viruses spread. To assure that a new virus attack does not spread faster than for example signature updates, each mobile security system 345 may be an active UAD. In one embodiment, as shown in FIG. 9, each mobile security system 345 is responsible for forwarding the signature updates to four other devices 345. As one skilled in the art will recognize, all devices 345 need to forward to the same number of other devices 345. Multiple devices 345 may be responsible for forwarding to the same device 345. When necessary, offline devices 345 being activated may poll the server, e.g., the security administrator 325, for routing table updates. Many other updating techniques are also possible.

The backup module 560 may constantly backup image and changes of the boot sector and system files of the mobile device 310 into the flash memory 520 or into another persistent memory device. That way, in case of major failure, including a loss of the system or boot sector of the mobile device 310, the mobile security system 345 may be identified as a CD-ROM during reboot and may launch the backup module (or separate program) to restore the boot sector and system files on the mobile device 310, thereby recovering the mobile device 310 without the need for IT support. In an embodiment where the network security system 345 supports multiple mobile devices 310, the backup module 560 may contain separate boot sector and system files for each of the mobile devices 310, if different.

FIG. 7 is a block diagram illustrating details of a smart policy updating system 700 in accordance with an embodiment of the present invention. System 700 includes the security administrator 325 coupled to the network security system 320 and to the mobile security system 345. The network security system 320 includes security engines 705, including an antivirus engine 715, an IPS/IDS engine 720, a firewall engine 725, and other security engines. The network security system 320 also includes security policies and data 710, including antivirus policies and data 730, IPS/IDS policies and data 735, firewall policies and data 740, and other policies and data. Similarly, the mobile security system 345 includes an antivirus engine 755, an IPS/IDS engine 760, a firewall engine 765, and other engines. The mobile security system 345 also includes security policies and data 535/540, including antivirus security policies and data 770, IPS/IDS security policies and data 775, firewall security policies and data 780, and other security policies and data.

The security administrator 325 includes a wizard 745 for enabling substantially automatic initial and possibly dynamic setup of the security engines 530, security policies 535 and security data 540 on the mobile security system 345. In one embodiment, the wizard 745 may automatically load all security engines 705 and policies and data 710 of the network security system 320 as the security engines 530 and policies and data 535/540 on the mobile security system 345. In another embodiment, the wizard 745 may include all security engines 705 and policies and data 710 except those known to be irrelevant, e.g., those related to billing software used by accounting, those relating to web software running only on the web servers, etc. In another embodiment, the engines 530 would need to be loaded by an IT manager, and would not be loaded automatically by the wizard 745.

In one embodiment, the wizard 745 may determine whether the mobile security system 345 requires a particular security engine 530, e.g., an antivirus engine 755, IPS/IDS engine 760, firewall engine 765, etc. If so determined, then the wizard 745 would load the engine 530 onto the mobile security system 345. The wizard 745 would then determine which policies and data sets, e.g., some for antivirus engine 755, some for the IPS/IDS engine 760, some for the firewall engine 765, etc. are important to the mobile security system 345. The wizard 745 will then determine which of the antivirus policies and data 730 on the network security system 320 are relevant to the antivirus policies and data 770 on the mobile security system 345, which of the IPS/IDS policies and data 735 on the network security system 320 are relevant to the IPS/IDS policies and data 775 on the mobile security system 345, which of the firewall policies and data 740 on the network security system 320 are relevant to the firewall policies and data 780 on the mobile security system 345, and which of the other policies and data on the network security system 320 are relevant to the policies and data on the mobile security system 345. As stated above, the wizard 745 may determine that all security engines 705 or just a subset are needed on the mobile security system 345. The wizard 745 may determine that all policies and data 710 for a given engine type or just a subset should be forwarded. The wizard 745 may determine which relevant policies and data 710 should be forwarded to the mobile security system 345 based on rules developed by an IT manager, based on item-by-item selection during the setup procedure, etc. Alternative to the wizard 745, an IT manager can setup the engines 530 and policies and data 535/540 on the mobile security system 345 without the wizard 745.

The security administrator 325 may also include an update authorities device 750. The update authorities device 750 may obtain security system updates (e.g., signature updates) and may send the updates to the network security system 320 and to the mobile security system 345. One skilled in the art will recognize that the updates to the network security system 320 and the updates to the mobile security system 345 need not be the same. Further, the update authorities device 750 may obtain the updates from security managers, security engine developers, antivirus specialists, etc. The update authorities device 750 may forward the updates to all network security systems 320 and all mobile security systems 345, or may forward routing tables to all mobile security systems 345 and the updates only to an initial set of mobile security systems 345. The initial set of mobile security systems 345 may forward the updates to the mobile security systems 345 identified in the routing tables in a P2P manner, similar to the process illustrated in FIG. 9. As stated above, each mobile security system 345 operating to forward updates is itself acting as an update authorities device 750.

Other applications may be included on the mobile security system 345. For example, add-on applications for recurring revenue from existing customers may include general email, anti-spam, direct and secured email delivery, information vaults, safe skype and other instant messaging services, etc. Email Security and Anti-spam—implementation of mail relay on mobile security systems 345 (including the web security engine above) and a local spam quarantine (based on SendMail or similar process) may implement a complete mail security suite (SMTP and POP3) including anti-spam with real time indexing (via online web spam quarries). Users may have access to the quarantine to review spam messages, release messages, modify and custom spam rules, etc., via a web interface. Direct and Secured Email Delivery based on mail relay will allow the mobile security system 345 to send user email directly from one mobile security system 345 to another mobile security system 345 without using in route mail servers. This allows corporate users to send emails that need not travel in the interne, thus leaving trace and duplicates on different unknown mail servers in route. This combined with the ability to use a secured pipe between two mobile security systems is valuable to corporations. Without such methodology, people could trace emails exchange without accessing to the enterprise's mail server, by tracking down copies in intermediate mail servers that were used to deliver the messages. Information Vault— Application to encrypt and store end user information on the mobile security system 345 may be available only to authorized users via a web interface and a web server implemented on every mobile security system 345 (e.g., BOA, Apache, etc.) Safe Skype and Other IM—implementing an instant messaging client on the mobile security system 345 can guarantee that the instant messaging system or P2P application has no access to data on the mobile device 310. Adding a chipset of AC/97 to provide a sound interface on the mobile security system 325 could allow users to talk and receive calls directly from/to the mobile security system 325.

Although not shown, a small battery may be included with the mobile security system 345. This battery may be charged by the USB connection during runtime or using the power adapter at any time. The battery may guarantee proper shutdown, e.g., when user disconnects the USB cable from the mobile security system 345. It will be signaled by the system which will launch applications and system shutdown. This will ensure a proper state of the file system and flashing open files buffers.

A multi-layered defense and detection abilities is required. This may be done by a special code that is constantly monitoring the scanning result by different systems (antivirus, IDS/IPS, firewall, antispyware, URL category, etc.) and at different levels to build a puzzle and identify an attack even if it's not recognized by each of the individual subsystems. By doing this, the mobile security system 345 will maintain and in some cases even improve the security level provided within the enterprise 540.

One available benefit of the mobile security system 345 is its ability to enforce the policy of the enterprise 540 on the end user while they are traveling or working from home. Since the mobile security system 345 uses similar security engines and policy as when connected from within the enterprise 540 and since the end user cannot access the internet 330 without it (except via VPN connection into the enterprise 540), IT may be capable of enforcing its security policy beyond the boundaries of the enterprise 540. The OS may be under the entire supervision of IT, while the mobile security system 3450S acts as an end user OS under his control. This resolves the problems of who controls what and how security and productivity face minimal compromise.

A standalone version of the mobile security system 345 may offer the same functionality, and may provide a local management interface via web browser. Attractive to home users and small offices that lack an IT department, the mobile security system 345 enables the end user to launch a browser, connect to the mobile security system 345, set the different policies (update policy, security rules, etc.) including modifying the white and black URL lists, etc. There is also an opportunity to provide end users with a service of remote management of the mobile security systems 345 by subscription.

Figure 10A:
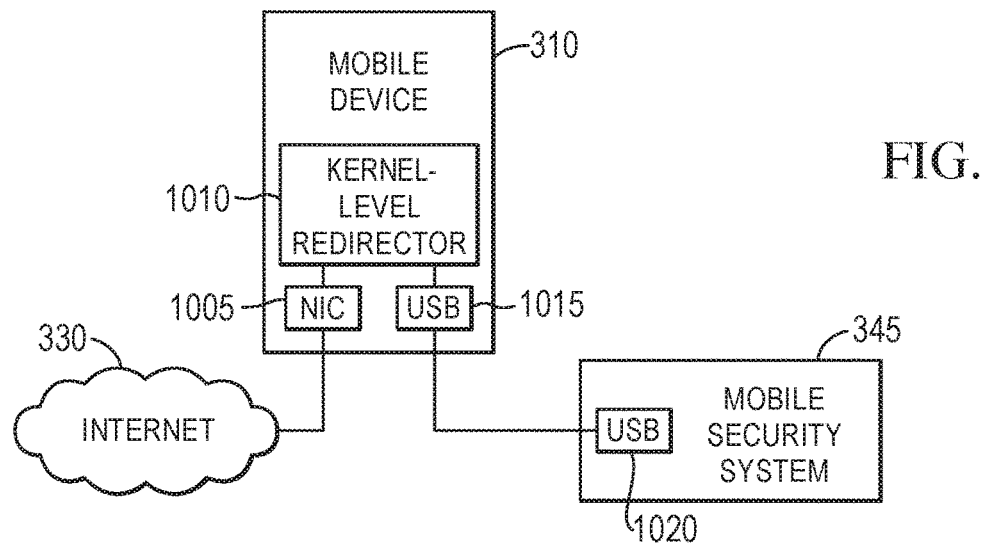
FIGS. 10A-10C are block diagrams illustrating various architectures for connecting a mobile device to a mobile security system, in accordance with various embodiments of the present invention.
Figure 10B:
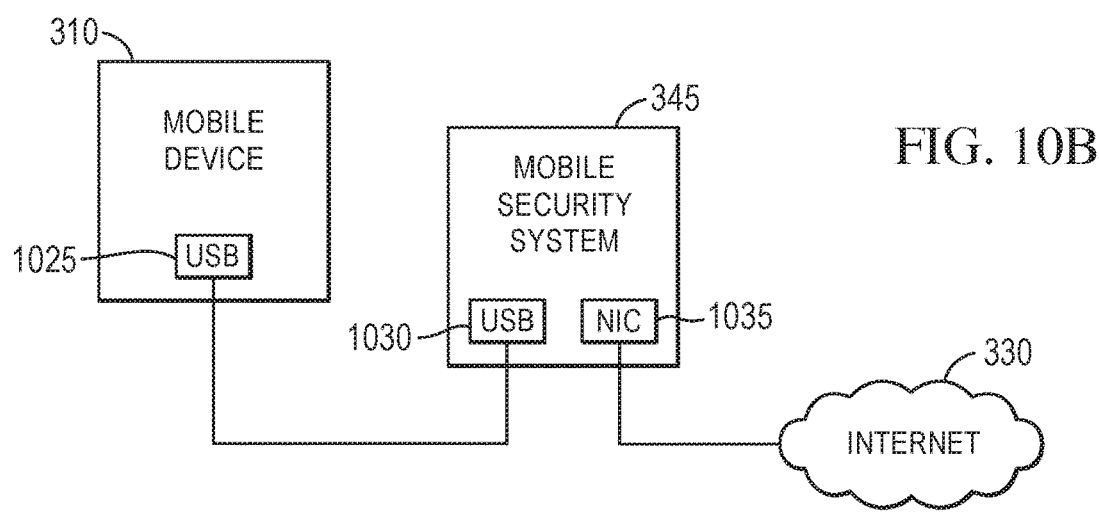
Figure 10C:
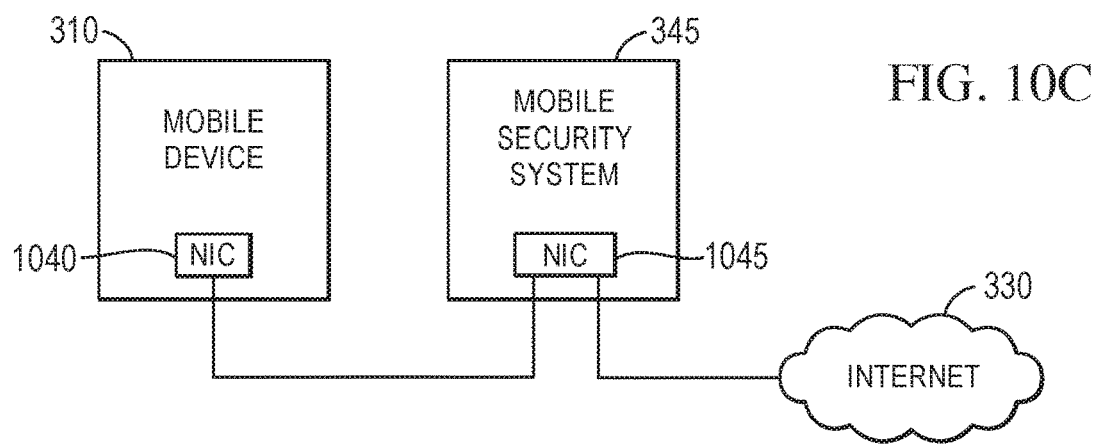
Figure 11:
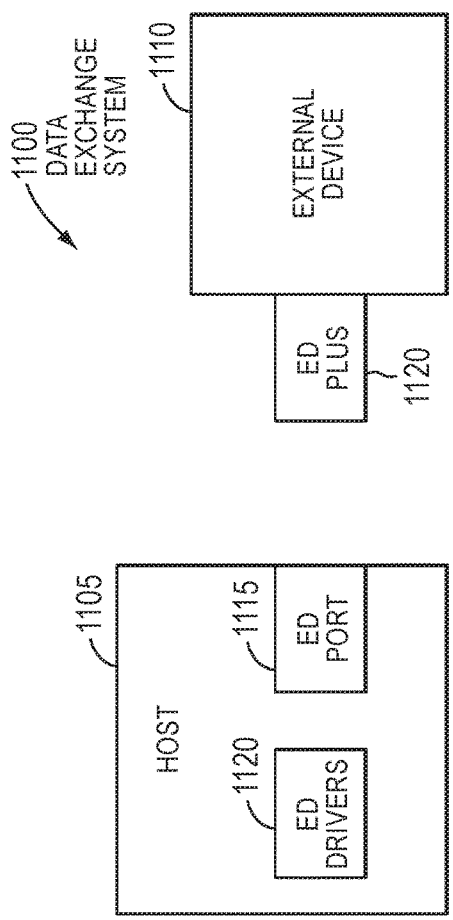
FIG. 11 is a block diagram illustrating a prior art data exchange system.

FIGS. 10A, 10B and 10C illustrate three example architectures of connecting a mobile security system 345 to a mobile device 310, in accordance with various embodiments of the present invention. In FIG. 10A, the mobile device 310 is coupled to the mobile security system 345 via USB connections 1015 and 1020 and is coupled to the internet 330 via a NIC card 1005. The mobile device 310 receives internet traffic from the internet 330 via its NIC card 1005. A kernel-level redirector 1010 (e.g., via NDIS, Winsock, etc.) on the mobile device 310 automatically redirects the internet traffic via the USB connections 1015 and 1020 to the mobile security system 345, which scans, cleans and returns the cleaned internet traffic to the mobile device 310 via the USB connections 1015 and 1020. In FIG. 10B, the mobile device 310 is coupled to the mobile security system 345 via USB connections 1025 and 1030. The mobile security system 345 includes a NIC card 1035 for receiving internet traffic from the internet 330. The mobile security system 345 scans, cleans and forwards the internet traffic via the USB connections 1025 and 1030 to the mobile device 310. In FIG. 10C, the mobile device 310 is coupled to the mobile security system 345 via NIC cards 1040 and 1045. The mobile security system 345 receives internet traffic from the internet 330 via its NIC card 1045. The mobile security system 345 scans, cleans and forwards the internet traffic wirelessly via the NIC cards 1040 and 1045 to the mobile device 310. Other connection architectures are also possible.

Figure 12:
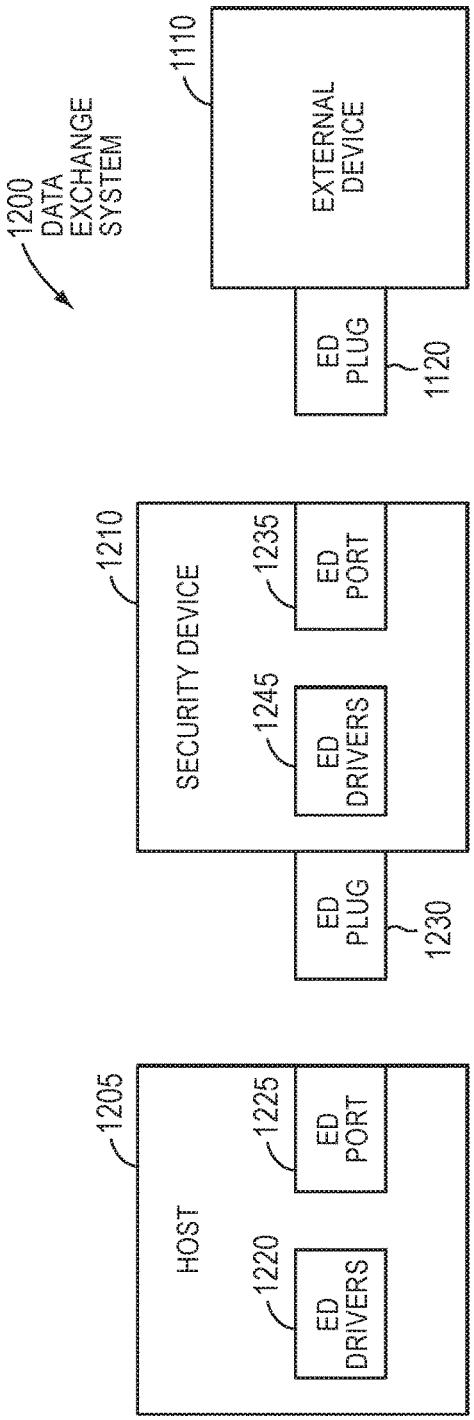
FIG. 12 is a block diagram illustrating a secure data exchange system, in accordance with an embodiment of the present invention.

FIG. 12 is a block diagram illustrating a secure data exchange system 1200, in accordance with an embodiment of the present invention. The secure data exchange system 1200 includes a host computer (host) 1205 coupled via a security device 1210 to an external device 1110. The host 1205 may include a laptop, desktop, PDA, mobile phone, or other processor-based device. The external device 1110 may be any external device with memory such as a USB drive, external hard drive, PDA, music player, cell phone, etc. The security device 1210 is communicatively coupled to the host 1205 via an ED port 1225 (USB, serial, parallel, Firewire, Ethernet, WiFi, WiMAX, GSM, CDMA, Bluetooth, PCM-CIA and/or other connection) and an ED plug 1230 (USB, serial, parallel, Firewire, Ethernet, WiFi, WiMAX, GSM, CDMA, Bluetooth, PCMCIA and/or other connection). The external device 1110 is communicatively coupled to the security device 1210 via an ED port 1235 (USB, serial, parallel, Firewire, Ethernet, WiFi, WiMAX, GSM, CDMA, Bluetooth, PCMCIA and/or other connection) and ED plug 1120 (USB, serial, parallel, Firewire, Ethernet, WiFi, WiMAX, GSM, CDMA, Bluetooth, PCMCIA and/or other connection). The connector type of the ED port 1225 and ED plug 1230 combination may be different that the collector type of the ED port 1235 and ED plug 1120 combination. In one embodiment, all ports 1225/1235 and plugs 1230/1120 are USB. Although the plugs 1120/1230 are illustrated as male and ports 1225/1235 are shown as female, one skilled in the art will recognize that the opposite is possible (plugs 1120/1230 may be female and ports 1225/1235 may be male).

The host 1205 includes ED drivers 1220 for performing enumeration and enabling communication with the security device 1210. Similarly, the security device 1210 includes ED drivers 1245 for performing enumeration and enabling communication with the external device 1110.

In one embodiment, the security device 1210 includes a programmable hardware appliance capable of enforcing security policies to protect against malicious code such as viruses, spyware, adware, Trojan Horses, etc. and to protect against transfer of private data. In one embodiment, the security device 1210 is configured to protect both the host 1205 and the external device 1215. In one embodiment, the security device 1210 is configured to protect only one of the external device 1110 or the host 1205. Additional details of the security device 1210 are provided with reference to FIGS. 13 and 14.

Figure 13:
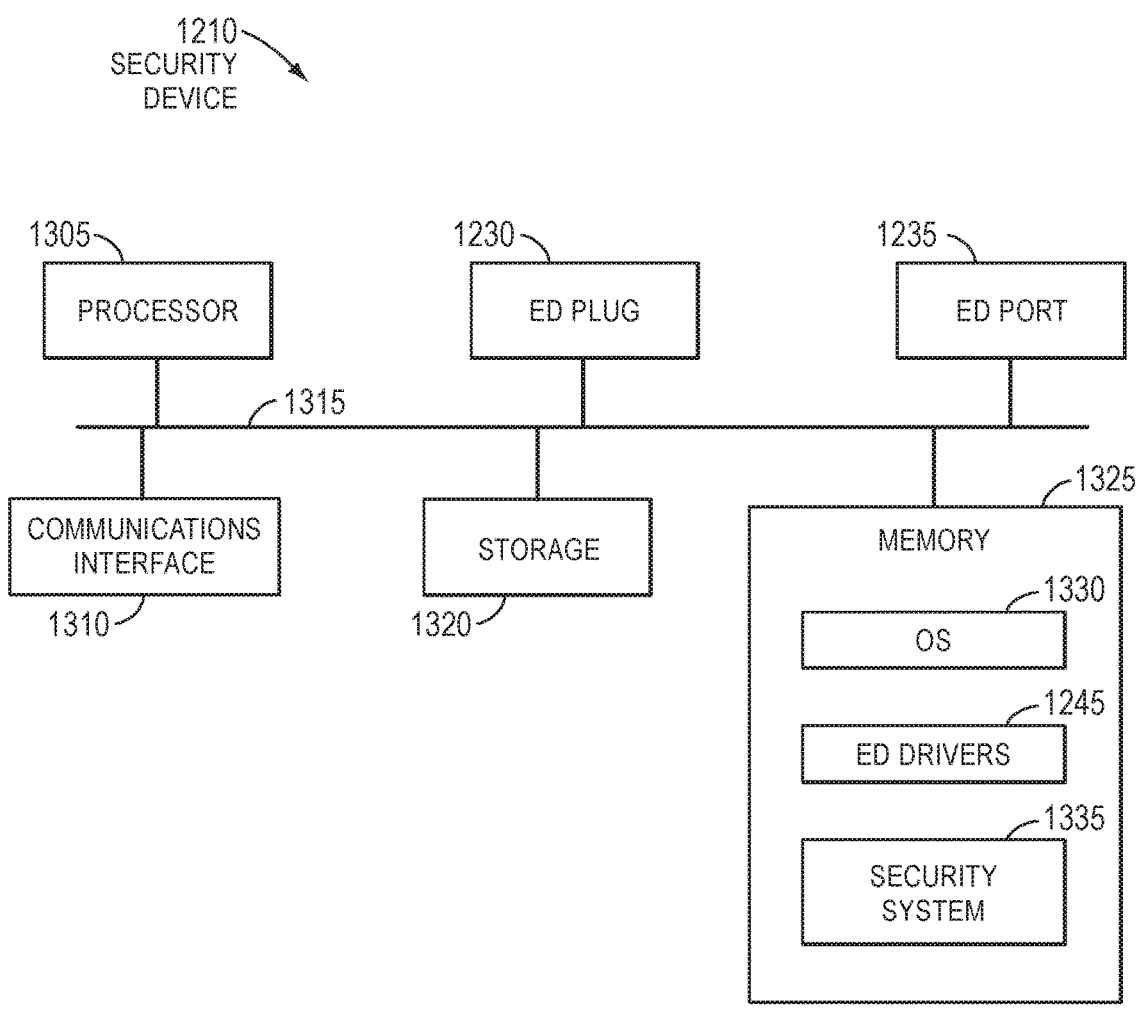
FIG. 13 is a block diagram illustrating details of a security device, in accordance with an embodiment of the present invention.

FIG. 13 is a block diagram illustrating details of the security device 1210, in accordance with an embodiment of the present invention. The security device 1210 include a processor 1305, such as an Intel Pentium® microprocessor or a Motorola Power PC® microprocessor, coupled to a communications channel 1315. The security device 1210 further includes an ED plug 1230, an ED port 1235, a communications interface 1310, storage 1320 such as an EEPROM, and memory 1325 such as Random-Access Memory (RAM) or Read Only Memory (ROM), each coupled to the communications channel 1315. The communications interface 1310 may be coupled to a network such as the internet. One skilled in the art will recognize that, although the storage 1320 and memory 1325 are illustrated as different units, the data storage device 1320 and memory 1325 can be parts of the same unit, distributed units, virtual memory, etc. The term "memory" herein is intended to cover all data storage media whether permanent or temporary. One skilled in the art will recognize that the security device 1210 may include additional components, such as network connections, additional memory, additional processors, LANs, input/output lines for transferring information across a hardware channel, the internet or an intranet, etc.

As shown, memory 1325 stores an operating system 1330 such as the Microsoft Windows XP, the IBM OS/2 operating system, the MAC OS, Unix OS, Linux OS, etc. It will be appreciated that a preferred embodiment may also be implemented on platforms and operating systems other than those mentioned. An embodiment may be written using JAVA, C, and/or C++ language, or other programming languages, possibly using object oriented programming methodology. The memory 1325 also stores ED drivers 1245 and a security system 1335. The ED drivers 1245 may include standard drivers for standard external devices 1110 and proprietary drivers for proprietary external devices 1110. The ED drivers 1245 may be transferred onto the memory 1325 via ED plug 1230. The security system 1335 includes code for enforcing security policies on data transfer actions between the host 1205 and external device 1110.

Figure 14:
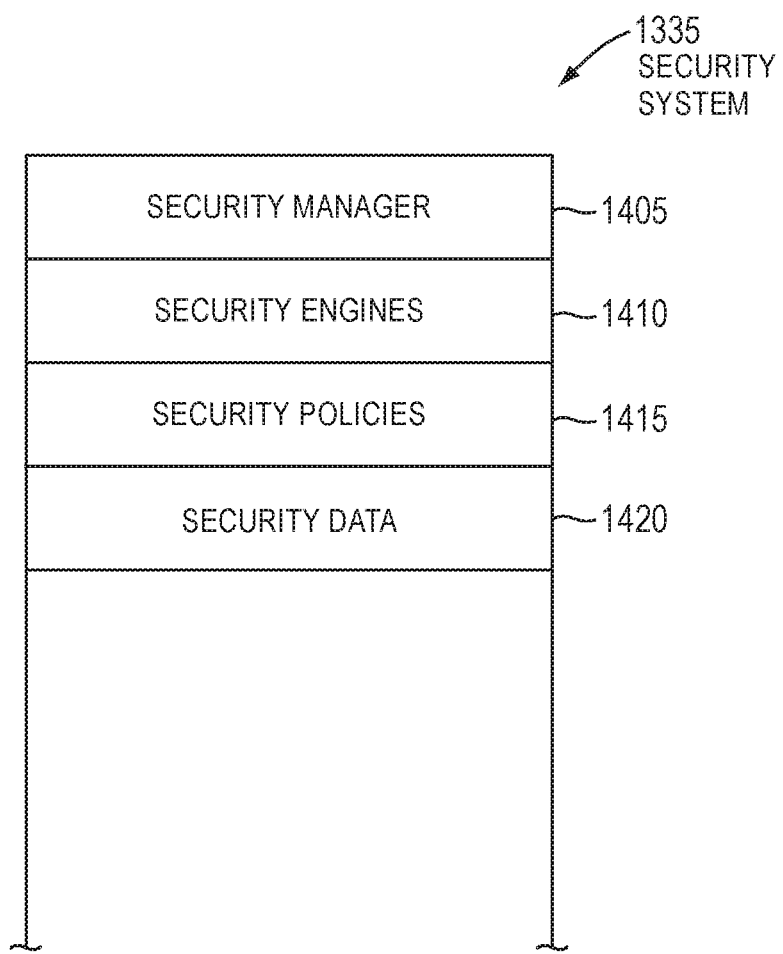
FIG. 14 is a block diagram illustrating details of a security system, in accordance with an embodiment of the present invention.

FIG. 14 is a block diagram illustrating details of a security system 1335, in accordance with an embodiment of the present invention. The security system 1335 includes a security manager 1405, security engines 1410, security policies 1415, and security data 1420.

In one embodiment, the security manager 1405 includes code for performing enumeration, namely, to identify the external device 1110 or external device 1110 type and to identify the corresponding ED driver 1245 capable of establishing communication between the security device 1210 and the external device 1110. The security manager 1405 also includes code to control execution of the various security engines 1410 based on the security policies 1415 and security data 1420 to evaluate data transfer requests or other device requests. Further, the security manager 1405 includes code to communicate with the host 1205, which will be the source of the data transfer and/or other requests.

In one embodiment, the security engines 1410 includes code for securing the transfer of data between the host 1205 and the external device 1110 based on the security policies 1415 and security data 1420. The security engines 1410 may include firewalls, antivirus, antispyware, malicious content filtering, multilayered security monitors, Java and bytecode monitors, etc. The security engines 1410 may also include data privacy modules to enforce data privacy policies 1415. Each security engine 1410 may have dedicated security policies 1415 and security data 1420 to indicate which procedures, URLs, system calls, content, ID, etc. the data requested for transfer may contain or whether the data requested for transfer is considered nontransferable (or nontransferable without additional security measure such as a password and ID).

To provide a higher security level, the security engines 1410 may implement content analysis and risk assessment algorithms. In one embodiment, a security engine 1410 assigns a weight and rank for every transfer object based on its type, complexity, richness in abilities, source, etc. The security engine 1410 may assign weight based on the source using a list of known dangerous or known safe sources. The security engine 1410 may assign weight to objects based on the category of the source, e.g., a gambling source, an adult content source, a news source, a reputable company source, a banking source, etc. The security engine 1410 may calculate the weight, and based on the result determine whether to allow or disallow access to the content, the script to run, the system modification to occur, etc. The security engine 1410 may "learn" user content (by analyzing for a predetermined period of time the general content that the user accesses) and accordingly may create personal content profiles. The personal content profile may be used to calibrate the weight assigned to content during runtime analysis to improve accuracy and tailor weighted risk analysis for specific user characteristics.

Thus, upon receiving a data transfer and/or other request from the host 1205, the security manager 1405 will launch the appropriate security engines 1410 based on the security policies 1415. For example, the security policies 1415 may be configured not to allow specific ActiveX controls to be loaded from the host 1205 onto the external device 1110. The security policies 1415 may be configured not to allow data transfer from private folders on the host 1205 to the external device 1110. The security manager 1405 will launch the appropriate security engines 1410 to assure that these example security policies 1415 are met. Further, the security engines 1410 may use security data 1420, which may include definition files of malicious ActiveX controls, locations of private folders, etc.

Although not shown, the security system 1335 may include additional components such as the preboot flash 520 with OS and applications, the remote management module 550, the distribution module 555, and the backup module 560 discussed above with reference to FIG. 5. Other components are also possible.

Figure 15:
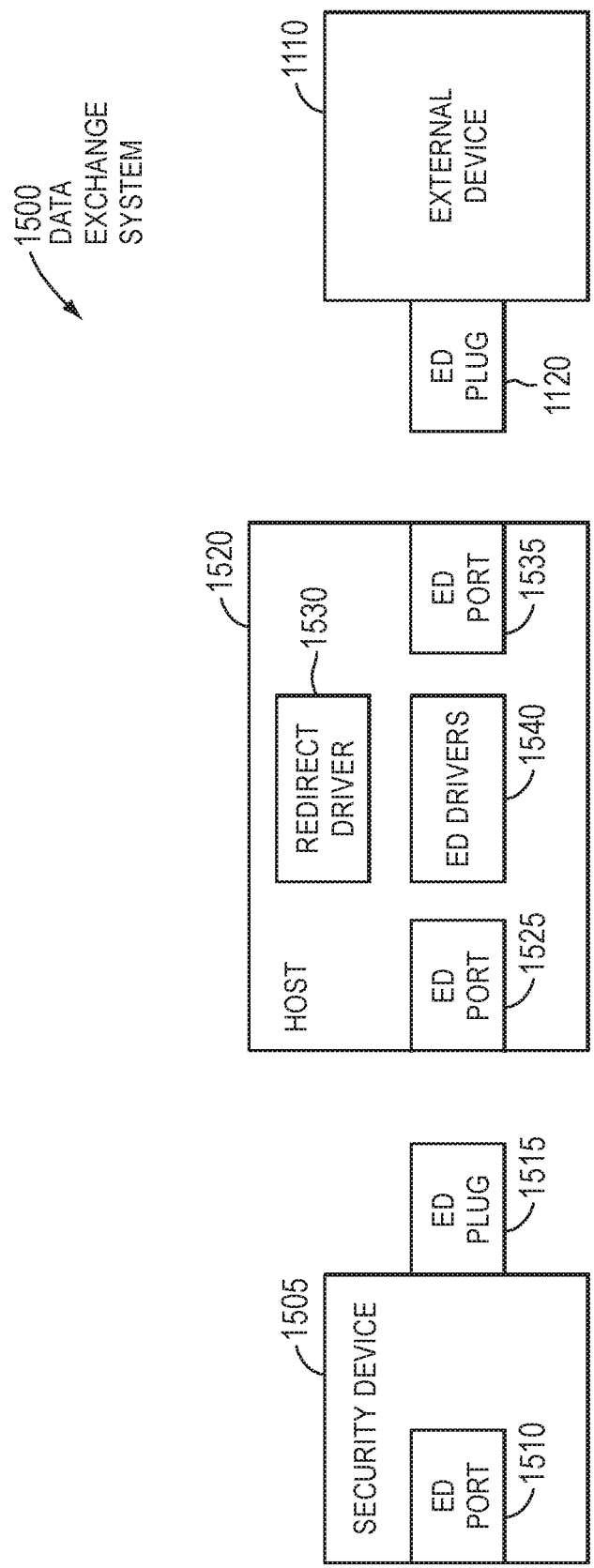
FIG. 15 is a block diagram illustrating a secure data exchange system, in accordance with another embodiment of the present invention.

FIG. 15 is a block diagram illustrating a secure data exchange system 1500, in accordance with another embodiment of the present invention. The secure data exchange system 1500 includes a security device 1505 communicatively coupled to the host 1520 via an ED plug 1515 on the security device 1505 and a first ED port 1525 on the host 1520. The secure data exchange system 1500 also includes an external device 1110 communicatively coupled to the host 1520 via the ED plug 1120 on the external device 1110 and a second ED port 1535 on the host 1520.

Because the external device 1110 is not directly coupled to the security device 1505, the security device 1505 is not physically intercepting the data transfer requests between the external device 1110 and the host 1520. Accordingly, in this embodiment, the host 1520 includes a redirect driver 1530, which is configured to redirect data transfer requests between the external device 1110 and the host 1520 regardless of data transfer direction. In one embodiment, the security device 1505 may be configured to protect only one of the external device 1110 or the host 1520. Further, in one embodiment, the security device 1505 does not contain any ED drivers, e.g., ED drivers 1245.

In one embodiment, if the security device 1505 is not coupled to the host 1520, the host 1520 uses the ED drivers 1540 to communicate with the external device 1110. In one embodiment, the host 1520 is configured not to communicate with the external device 1110 until the security device 1505 is coupled to the host 1520. In one embodiment, the host 1520 uses the ED drivers 1540 to communicate with the external device 1110 only if additional security measures are taken, such as receipt of a password and ID, or until the security device 1505 is coupled to the host 1520.

In one embodiment, the host 1520 may conduct enumeration of the security device 1505 upon connection of the security device 1505 to the ED port 1525. Upon identifying the security device 1505 or security device 1505 type, the host 1520 may initiate the redirect driver 1530 to redirect all data transfer requests or other external device 1110 requests from all other ED ports 1535 to the security device 1505. In one embodiment, the redirect driver 1530 only accepts data transfer requests from the security device 1505, which presents the requests of the external device 1110 as a proxy. In one embodiment, the redirect driver 1530 performs data transfer requests received from the external device 1110 only after the security device 1505 has conducted its check and given its authorization. Other protocols are also possible.

Figure 16:
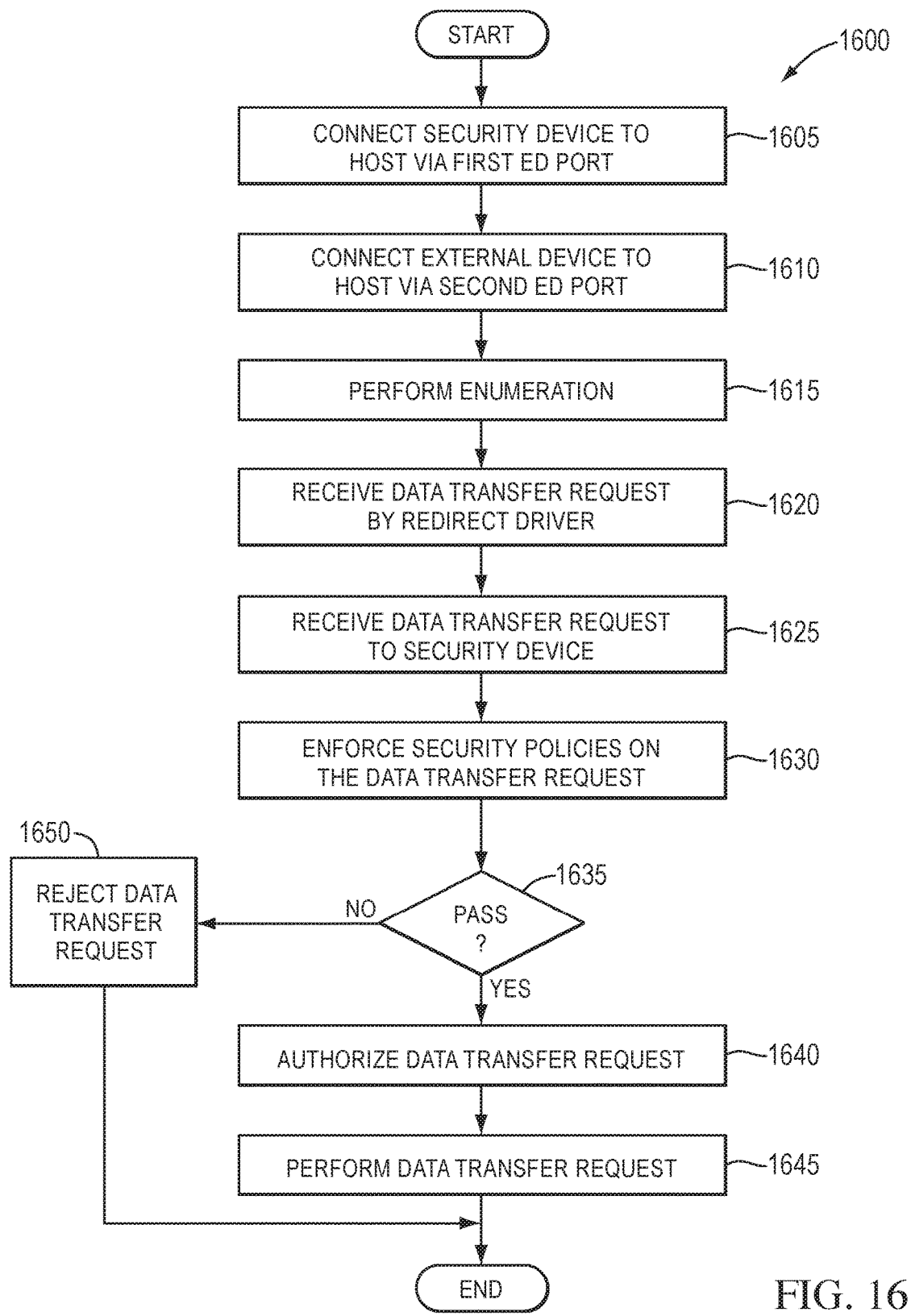
FIG. 16 is a flowchart illustrating a method of secure data exchange between a host and an external device, in accordance with an embodiment of the present invention.

FIG. 16 is a flowchart illustrating a method 1600 of secure data exchange between a host and an external device, in accordance with an embodiment of the present invention. The method 1600 begins in step 1605 with the security device 1505 being connected to the first ED port 1525 of the host 1520. The external device 1110 in step 1610 is connected to the second ED port 1535 of the host 1520. The host 1505 in step 1615 performs enumeration techniques to identify the security device 1505 and the external device 1110 and to install the appropriate drivers 1530/1540 to enable communication with the security device 1505 and the external device 1110. The redirect driver 1530 in step 1620 receives a data transfer request from either the host 1505 to the external device 1110 or from the external device 1110 to the host 1505. The redirect driver 1530 in step 1625 redirects the data transfer request to the security device 1505, which in step 1630 enforces its security policies (antivirus, antispyware, anti-adware, data privacy, etc.) on the data transfer request. The security device 1505 in step 1635 determines whether the data transfer request passes the security policies. If so, then the security device 1505 in step 1640 authorizes the data transfer request and the host 1520 in step 1645 performs the data transfer request. If not, then the security device 1505 in step 1650 rejects the data transfer request. Method 1600 then ends.

It will be appreciated that, in one embodiment, the security device 1210/1505 may be implemented as part of the host 1205/1520, e.g., within the housing of the host 1205/1520 and/or as a security procedure executed by the host 1205/1520.

The foregoing description of the preferred embodiments of the present invention is by way of example only, and other variations and modifications of the above-described embodiments and methods are possible in light of the foregoing teaching. Although the network sites are being described as separate and distinct sites, one skilled in the art will recognize that these sites may be a part of an integral site, may each include portions of multiple sites, or may include combinations of single and multiple sites. The various embodiments set forth herein may be implemented utilizing hardware, software, or any desired combination thereof. For that matter, any type of logic may be utilized which is capable of implementing the various functionality set forth herein. Components may be implemented using a programmed general purpose digital computer, using application specific integrated circuits, or using a network of interconnected conventional components and circuits. Connections may be wired, wireless, modem, etc. The embodiments described herein are not intended to be exhaustive or limiting. The present invention is limited only by the following claims.

The invention claimed is:

1. A system comprising:
   an external device configured to store and retrieve data in response to approved data transfer requests, the external device including an external device communication interface;
   a security device including a security engine and security policies, the security policies including data privacy policies, the security device further including at least one security device hardware processor configured to execute the security engine to evaluate redirected data transfer requests involving the external device against the security policies including against the data privacy policies, the security policies indicating an approvable data transfer request or indicating a disapprovable data transfer request, the security engine configured to assist in determining whether to approve or whether to disapprove each of the redirected data transfer requests based on the evaluation of the redirected data transfer requests against the security policies including against the data privacy policies, the security device including a security device connection interface, the security device configured to use the at least one security device hardware processor to:

receive a particular redirected data transfer request;

evaluate, using the security engine, the particular redirected data transfer request against the security policies including against the data privacy policies to determine whether to approve or whether to disapprove the particular redirected data transfer request; and generate, using the security engine, a particular approval or a particular disapproval based on the evaluation of the particular redirected data transfer request; and a host device including at least one host device hardware processor, a first host communication interface and a second host communication interface, the first host communication interface being communicatively coupled to the external device communication interface to enable data communications between the host device and the external device, the second host communication interface being communicatively coupled to the security device communication interface to enable data communications between the host device and the security device, the host device further including a redirection driver configured to automatically redirect received data transfer requests to the security device, the host device configured to use the at least one host device hardware processor to:

receive a particular data transfer request;

use the redirection driver to automatically redirect the particular data transfer request to the security device as the particular redirected data transfer request;

receive the particular approval or the particular disapproval from the security device; and initiate performance of the particular data transfer request when the particular approval is received or when the particular disapproval is not received.

2. The system of claim 1, wherein each of the external device communication interface and the first host communication interface includes an Ethernet interface.

3. The system of claim 1, wherein each of the security device communication interface and the second host communication interface includes an Ethernet interface.

4. The system of claim 1, wherein the security engine is further configured to evaluate particular data involved in the particular data transfer request for malicious or potentially malicious code.

5. The system of claim 1, wherein the security engine is further configured to evaluate the particular data transfer request based on a data type of particular data involved in the particular data transfer request.

6. The system of claim 5, wherein the security engine is further configured to deny the particular data transfer request when the particular data involved in the particular data transfer request is of a particular data type.

7. The system of claim 5, wherein the security engine is further configured to request an additional security measure when the particular data involved in the particular data transfer request is of a particular data type.

8. The system of claim 7, wherein the additional security measure includes a request for a password and an identifier.

9. The system of claim 1, wherein the security engine applies weighting factors based on a data source of particular data involved in the particular data transfer request.

10. The system of claim 1, wherein the security engine is further configured to deny the particular data transfer request when the particular data involved in the particular data transfer request is stored in a protected folder.

11. A method comprising:

receiving a particular data transfer request by a host device, the particular data transfer request including a request to transfer particular data to or from an external data storage device, the external data storage device including an external device communication interface, the host device including a first host communication interface and a second host communication interface, the first host communication interface being communicatively coupled to the external device communication interface to enable data communications between the host device and the external data storage device, the host device further including a redirection driver configured to automatically redirect received data transfer requests including the particular data transfer request to a security device;

using the redirection driver to automatically redirect the particular data transfer request from the host device to the security device as a redirected data transfer request, the security device including a security engine and security policies, the security policies including data privacy policies, the security policies indicating an approvable data transfer request or indicating a disapprovable data transfer request, the security device configured to evaluate data transfer requests involving the external data storage device against the security policies including against the data privacy policies, the security engine configured to assist in determining whether to approve or whether to disapprove each of the data transfer requests including the redirected data transfer request based on the evaluation of each of the data transfer requests against the security policies including against the data privacy policies, the security device including a security device connection interface communicatively coupled to the second host communication interface to enable data communications between the host device and the security device;

using the security engine to evaluate the redirected data transfer request against the security policies including against the data privacy policies to determine whether to approve or whether to disapprove the redirected data transfer request;

using the security engine to generate a particular approval or a particular disapproval based on the evaluation of the redirected data transfer request; and initiating performance of the particular data transfer request when the particular approval is received or when the particular disapproval is not received.

12. The method of claim 11, wherein each of the external data storage device communication interface and the first host communication interface includes an Ethernet interface.

13. The method of claim 11, wherein each of the security device communication interface and the second host communication interface includes an Ethernet interface.

14. The method of claim 11, further comprising using the security engine to evaluate the particular data involved in the particular data transfer request for malicious or potentially malicious code.

15. The method of claim 11, further comprising using the security engine to evaluate the particular data transfer request based on a data type of the particular data involved in the particular data transfer request.

16. The method of claim 15, further comprising using the security engine to deny the particular data transfer request when the particular data involved in the particular data transfer request is of a particular data type.

17. The method of claim 15, further comprising using the security engine to request an additional security measure when the particular data involved in the particular data transfer request is of a particular data type.

18. The method of claim 17, wherein the additional security measure includes a request for a password and an identifier.

19. The method of claim 11, further comprising using the security engine to apply weighting factors based on a data source of the particular data involved in the particular data transfer request.

20. The method of claim 11, further comprising using the security engine to deny the particular data transfer request when the particular data involved in the particular data transfer request is stored in a protected folder.

\* \* \* \* \*